US010650195B2

(12) United States Patent
Fujiwara et al.

(10) Patent No.: US 10,650,195 B2
(45) Date of Patent: May 12, 2020

(54) TRANSLATED-CLAUSE GENERATING METHOD, TRANSLATED-CLAUSE GENERATING APPARATUS, AND RECORDING MEDIUM

(71) Applicant: Panasonic Intellectual Property Management Co., Ltd., Osaka (JP)

(72) Inventors: Nanami Fujiwara, Nara (JP); Masaki Yamauchi, Osaka (JP); Masahiro Imade, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 15/956,352

(22) Filed: Apr. 18, 2018

(65) Prior Publication Data

US 2018/0341646 A1     Nov. 29, 2018

(30) Foreign Application Priority Data

May 23, 2017    (JP) ................................ 2017-101467

(51) Int. Cl.
| | | |
|---|---|---|
| *G06F 40/49* | (2020.01) | |
| *G06F 16/35* | (2019.01) | |
| *G06F 40/42* | (2020.01) | |
| *G06F 40/51* | (2020.01) | |
| *G06F 40/58* | (2020.01) | |
| *G06F 40/253* | (2020.01) | |

(52) U.S. Cl.
CPC .............. *G06F 40/49* (2020.01); *G06F 16/35* (2019.01); *G06F 40/253* (2020.01); *G06F 40/42* (2020.01); *G06F 40/51* (2020.01); *G06F 40/58* (2020.01)

(58) Field of Classification Search
CPC ........ G06F 40/49; G06F 16/35; G06F 40/253; G06F 40/42; G06F 40/58; G06F 40/51
See application file for complete search history.

(56) References Cited

U.S. PATENT DOCUMENTS

| | | | | |
|---|---|---|---|---|
| 4,821,230 | A * | 4/1989 | Kumano | ............... G06F 17/271 704/6 |
| 8,000,957 | B2 * | 8/2011 | Deshpande | ......... G06F 16/9032 704/9 |
| 10,467,344 | B1 * | 11/2019 | Jade | .................... G06F 17/2705 |
| 2004/0260532 | A1 * | 12/2004 | Richardson | ......... G06F 17/2836 704/2 |

FOREIGN PATENT DOCUMENTS

| | | |
|---|---|---|
| JP | 2015-118498 | 6/2015 |
| JP | 2016-018354 | 2/2016 |

\* cited by examiner

*Primary Examiner* — Nafiz E Hoque
(74) *Attorney, Agent, or Firm* — Greenblum & Bernstein, P.L.C.

(57) ABSTRACT

A bilingual-corpus generating method includes: acquiring a first clause in the first language, a first translated clause obtained by translating the first clause into a second language, a second clause in the first language, a second translated clause obtained by translating the second clause into the second language; and generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language.

16 Claims, 18 Drawing Sheets

FIG. 4

| TRAVEL CATEGORY | | |
|---|---|---|
| FIRST CONDITION | VERB INCLUDED IN CLAUSE IN FIRST LANGUAGE | "iku", "noru", "susumu" |
| SECOND CONDITION | NOUN INCLUDED IN CLAUSE IN FIRST LANGUAGE | "kuruma", "densha", "toho" |
| THIRD CONDITION | LENGTH OF CLAUSE IN FIRST LANGUAGE | 15 CHARACTERS OR LESS |
| CONDITION FOR CLAUSE-AND-TRANSLATED-CLAUSE PAIR TO BELONG TO CATEGORY | | SATISFY FIRST AND THIRD CONDITIONS OR SATISFY SECOND AND THIRD CONDITIONS |

FIG. 5

| OBJECTIVE CATEGORY | | |
|---|---|---|
| FIRST CONDITION | VERB INCLUDED IN CLAUSE IN FIRST LANGUAGE | "aru", "mieru", "tsuku" |
| SECOND CONDITION | NOUN INCLUDED IN CLAUSE IN FIRST LANGUAGE | LANDMARK NAME, PLACE NAME, COUNTRY NAME |
| THIRD CONDITION | LENGTH OF CLAUSE IN FIRST LANGUAGE | 15 CHARACTERS OR LESS |
| CONDITION FOR CLAUSE-AND-TRANSLATED-CLAUSE PAIR TO BELONG TO CATEGORY | | SATISFY FIRST, SECOND, AND THIRD CONDITIONS |

FIG. 6

| CLAUSE IN FIRST LANGUAGE | TRANSLATED CLAUSE IN SECOND LANGUAGE | TAG INFORMATION |
|---|---|---|
| Massugu iku. | Go straight. | TRAVEL |
| Migi ni magaru. | Turn right. | TRAVEL |
| Sono kado wo hidari ni magaru. | Turn left at the corner. | TRAVEL |
| Kyoto tawaa ga aru. | There is a Kyoto tower. | OBJECTIVE |
| Tokyo-eki ga mieru. | You will see a Tokyo station. | OBJECTIVE |

FIG. 7

| CONNECTION RULE | TRAVEL CATEGORY + CONJUNCTION + OBJECTIVE CATEGORY | |
|---|---|---|
| CONJUNCTION | FIRST LANGUAGE (JAPANESE) | SECOND LANGUAGE (ENGLISH) |
| | to, ba, tara | and, then |

FIG. 8

| BILINGUAL CORPUS <PRE-UPDATE> ||
|---|---|
| Massugu iku. | Go straight. |
| Migi ni magaru. | Turn right. |
| Sono kado wo hidari ni magaru. | Turn left at the corner. |
| Kyoto tawaa ga aru. | There is a Kyoto tower. |
| Tokyo-eki ga mieru. | You will see a Tokyo station. |

FIG. 9

| BILINGUAL CORPUS <POST-UPDATE> ||
|---|---|
| Massugu iku. | Go straight. |
| Migi ni magaru. | Turn right. |
| Sono kado wo hidari ni magaru. | Turn left at the corner. |
| Kyoto tawaa ga aru. | There is a Kyoto tower. |
| Tokyo-eki ga mieru. | You will see a Tokyo station. |
| Massugu iku to Kyoto tawaa ga aru. | Go straight and there is a Kyoto tower. |
| Massugu iku to Kyoto tawaa ga aru. | Go straight then there is a Kyoto tower. |
| Massugu ike ba Kyoto tawaa ga aru. | Go straight and there is a Kyoto tower. |
| Massugu ike ba Kyoto tawaa ga aru. | Go straight then there is a Kyoto tower. |
| Massugu ittara Kyoto tawaa ga aru. | Go straight and there is a Kyoto tower. |
| Massugu ittara Kyoto tawaa ga aru. | Go straight then there is a Kyoto tower. |

FIG. 18

| TRANSLATION RESULT <PRE-UPDATE> ||
|---|---|
| INPUT | Massugu iku to Kyoto tawaa ga aru. |
| OUTPUT | Go straight and a Kyoto tower. |

FIG. 19

| TRANSLATION RESULT <POST-UPDATE> ||
|---|---|
| INPUT | Massugu iku to Kyoto tawaa ga aru. |
| OUTPUT | Go straight and there is a Kyoto tower. |

…

TRANSLATED-CLAUSE GENERATING METHOD, TRANSLATED-CLAUSE GENERATING APPARATUS, AND RECORDING MEDIUM

BACKGROUND

1. Technical Field

The present disclosure relates to a translated-clause generating method and a translated-clause generating apparatus for generating translated clauses to be used for translation processing between a first language and a second language and a recording medium.

2. Description of the Related Art

In recent years, machine translation apparatuses for translating a clause in a first language into a clause in a second language different from the first language have been studied and developed, and an improvement in the translation performance in such machine translation apparatuses requires a bilingual corpus containing a collection of a large number of sample clauses that can be used for translation. In particular, it is difficult for currently available machine translation apparatuses to translate a long clause or a complex sentence.

For example, Japanese Unexamined Patent Application Publication No. 2006-18354 (hereinafter referred to as "Patent Document 1") discloses a method in which an input text is divided into a plurality of texts, which are respectively translated to thereby translate a long clause with high accuracy. Japanese Unexamined Patent Application Publication No. 2015-118498 (Patent Document 2) discloses automatically generating a variety of similar clauses with the same intension to thereby collect a large number of speech clause examples.

SUMMARY

However, in the related technologies described above, no consideration has been given to creating a bilingual corpus containing long clauses in which a plurality of clauses are joined together with a conjunction, and a further improvement is necessary.

In one general aspect, the techniques disclosed here feature a translated-clause generating method for a translated-clause generating apparatus for generating a translated clause used in translation processing between a first language and a second language. The method includes: acquiring a first clause in the first language, a first translated clause obtained by translating the first clause into a second language, a second clause in the first language, a second translated clause obtained by translating the second clause into the second language; and generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language.

According to the present disclosure, it is possible to improve the translation performance of a long clause in which a plurality of clauses are joined together with a conjunction.

These general and specific aspects may be implemented using a system, a method, a computer program, or any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates one example of category condition data stored in a category database and used for deciding whether or not a clause-and-translated-clause pair belongs to a travel category;

FIG. 5 illustrates one example of the category condition data stored in the category database and used for deciding whether or not a clause-and-translated-clause pair belongs to an objective category;

FIG. 6 illustrates one example of data stored in a category-tagged-data storage;

FIG. 7 illustrates one example of a connection rule stored in a connection-rule storage;

FIG. 8 illustrates one example of a pre-update bilingual corpus stored in a bilingual-corpus storage;

FIG. 9 illustrates one example of a post-update bilingual corpus stored in the bilingual-corpus storage;

FIG. 18 illustrates one example of a translation result of machine translation using a machine translation model that has performed learning using a pre-update bilingual corpus;

FIG. 19 illustrates one example of a translation result of machine translation using a machine translation model that has performed learning using a post-update bilingual corpus;

DETAILED DESCRIPTION (Findings Underlying Present Disclosure)

Figure 1:
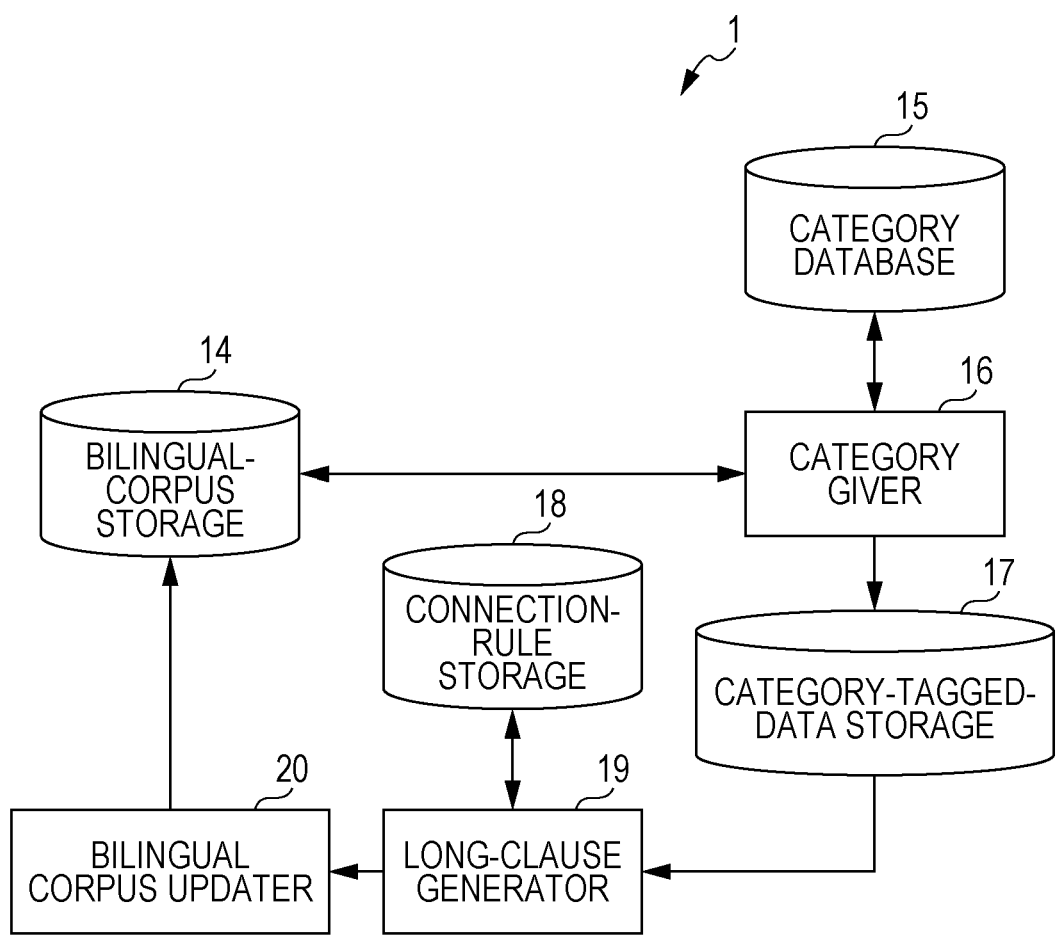
FIG. 1 is a block diagram illustrating the configuration of a bilingual-corpus generating apparatus in a first embodiment of the present disclosure.

In recent years, machine translation apparatuses for translating a clause in a first language into a clause in a second language different from the first language have been studied and developed, and an improvement in the translation performance in such machine translation apparatuses requires a bilingual corpus containing a collection of a large number of sample clauses that can be used for translation. However, it is difficult for currently available machine translation apparatuses to translate a long clause (a complex sentence) in which a plurality of clauses are joined together with a conjunction.

In Patent Document 1 noted above, an input text is divided into shorter texts, which are respectively translated, thereby improving the translation performance. Also, in Patent Document 2 noted above, a variety of similar clauses with the same intension are automatically generated to thereby collect a large number of speech clause examples.

However, in particular, an improvement in the performance of translating a long clause in which a plurality of clauses are joined together with a conjunction requires a bilingual corpus for long clauses, and it is difficult to create a bilingual corpus containing long clauses.

In order to overcome the above-described problem, a translated-clause generating method according to one aspect of the present disclosure is directed to a translated-clause generating method for a translated-clause generating apparatus for generating a translated clause used in translation processing between a first language and a second language. The method includes: acquiring a first clause in the first language, a first translated clause obtained by translating the first clause into a second language, a second clause in the first language, a second translated clause obtained by translating the second clause into the second language; and generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language.

According to this configuration, a first clause in a first language, a first translated clause obtained by translating the first clause into a second language, a second clause in the first language, and a second translated clause obtained by translating the second clause into the second language are acquired. A third translated clause obtained by constructing the first translated clause and the second translated clause as one sentence by using a second conjunction in the second language is generated as a translated clause of a third clause obtained by constructing the first clause and the second clause as one sentence by using a first conjunction in the first language.

Thus, when a long clause in which a plurality of clauses are joined together with a conjunction is translated using the generated third translated clause, it is possible to improve the translation performance of the long clause in which the plurality of clauses are joined together with the conjunction.

The translated-clause generating method may further include outputting at least the third translated clause. According to this configuration, at least the third translated clause is output to thereby make it possible to perform translation processing on an input clause by using the third translated clause.

The translated-clause generating method may further include: identifying the first conjunction, based on a connection rule stating a correspondence relationship between attribute information indicating an attribute of a sentence and the first conjunction; and generating the third clause by using the identified first conjunction, the first clause, and the second clause.

According to this configuration, the first conjunction is identified based on the connection rule stating the correspondence relationship between the attribute information indicating an attribute of a sentence and the first conjunction. The identified first conjunction, the first clause, and the second clause are used to generate the third clause.

Thus, since the first conjunction is identified based on the connection rule, it is possible to identify an appropriate first conjunction in the first language which joins the first clause and the second clause.

In the translated-clause generating method, the connection rule may further state a correspondence relationship between the attribute information and the second conjunction; the second conjunction may be identified based on the connection rule; and the third translated clause may be generated using the identified second conjunction, the first translated clause, and the second translated clause.

According to this configuration, the connection rule further states a correspondence relationship between the attribute information and the second conjunction. The second conjunction is then identified based on the connection rule. The identified second conjunction, the first translated clause, and the second translated clause are used to generate the third translated clause.

Thus, since the second conjunction is identified based on the connection rule, it is possible to identify an appropriate second conjunction in the second language which joins the first translated clause and the second translated clause.

In the translated-clause generating method, the attribute information may indicate a category classified according to a meaning of the sentence.

According to this configuration, since the attribute information indicates a category classified according to a meaning of a sentence, an appropriate first conjunction and an appropriate second conjunction can be identified based on meanings of the first clause and the second clause.

In the translated-clause generating method, a category database in which words and phrases that can be included in sentences and categories of the sentences are stored in association with each other may be searched for a category that corresponds to a word or a phrase included in the first clause to identify the category of the first clause; and the category database may be searched for the category that corresponds to a word or a phrase included in the second clause to identify the category of the second clause.

According to this configuration, the category database in which words and phrases that can be included in sentences and categories of the sentences are stored in association with each other is searched for a category that corresponds to a word or a phrase included in the first clause to thereby identify the category of the first clause. The category database is searched for a category that corresponds to a word or a phrase included in the second clause to thereby identify the category of the second clause.

Thus, the categories of the first clause and the second clause can be easily identified based on words or phrases included in the first clause and the second clause.

In the translated-clause generating method, the connection rule may be stored in a connection rule database; a combination of a first category that is one of the categories and a second category that is one of the categories, the first conjunction, and the second conjunction may be stored in the connection rule database in association with each other; and the connection rule database may be searched for the first conjunction and the second conjunction corresponding to the combination of the first category of the first clause and the second category of the second clause to identify the first conjunction and the second conjunction.

According to this configuration, the connection rule is stored in the connection rule database. A combination of a first category, which is one of the categories, and a second category, which is one of the categories, is stored in the connection rule database in association with the first conjunction and the second conjunction. The connection rule database is searched for the first conjunction and the second conjunction corresponding to the combination of the first category of the first clause and the second category of the second clause to thereby identify the first conjunction and the second conjunction.

Thus, the first conjunction and the second conjunction can be easily identified based on the combination of the first category and the second category.

In the translated-clause generating method, the first clause, the first translated clause corresponding to the first clause, the second clause, and the second translated clause corresponding to the second clause may be acquired from a bilingual-corpus storage that stores therein a bilingual corpus in which clauses in the first language and translated clauses obtained by translating the clauses in the first language into the second language are associated with each other.

According to this configuration, a first clause, a first translated clause corresponding to the first clause, a second clause, a second translated clause corresponding to the second clause are acquired from the bilingual-corpus storage that stores therein a bilingual corpus in which clauses in the first language and translated clause obtained by translating the clauses in the first language into a second language are associated with each other.

Thus, a third translated clause can be generated using the first translated clause and the second translated clause acquired from the bilingual corpus stored in the bilingual-corpus storage.

In the translated-clause generating method may further include: updating the bilingual corpus by storing the third clause and the third translated clause in the bilingual-corpus storage in association with each other; and causing a machine translation model used for the translation processing to perform learning using the updated bilingual corpus.

According to this configuration, the bilingual corpus is updated by storing the third clause and the third translated clause in the bilingual-corpus storage in association with each other. The machine translation model used for translation processing performs learning using the updated bilingual corpus.

Thus, when translation processing is performed using the machine translation model that has performed learning using the updated bilingual corpus, it is possible to more accurately translate a long clause in which a plurality of clauses are joined together with a conjunction.

The translated-clause generating method may further include: acquiring first determination information indicating a determination result of a determination as to whether or not the first translated clause is correct; acquiring second determination information indicating a determination result of a determination as to whether or not the second translated clause is correct; and generating the third translated clause when the first translated clause and the second translated clause are both determined to be correct based on the first determination information and the second determination information.

According to this configuration, the first determination information indicating a determination result of a determination as to whether or not the first translated clause is correct is acquired. In addition, the second determination information indicating a determination result of a determination as to whether or not the second translated clause is correct is acquired. When the first translated clause and the second translated clause are both determined to be correct based on the first determination information and the second determination information, the third translated clause is generated.

Thus, when the first translated clause and the second translated clause are both determined to be correct, the third translated clause is generated, thus making it possible to further improve the translation accuracy of the third translated clause.

The translated-clause generating method may further include: displaying the first translated clause, a first object for causing a user to input the determination result of the determination as to whether or not the first translated clause is correct, the second translated clause, and a second object for causing the user to input the determination result of the determination as to whether or not the second translated clause is correct.

According to this configuration, the first translated clause, the first object for causing a user to input a determination result of a determination as to whether or not the first translated clause is correct, the second translated clause, and the second object for causing the user to input a determination result of a determination as to whether or not the second translated clause is correct are displayed.

Thus, since the user inputs the determination result of the determination as to whether or not the first translated clause is correct and inputs the determination result of the determination as to whether or not the second translated clause is corrected, it is possible to improve the translation accuracy of the third translated clause.

The translated-clause generating method may further include: acquiring a first back-translated clause obtained by translating the first translated clause into the first language through application to the machine translation model; acquiring a second back-translated clause obtained by translating the second translated clause into the first language through application to the machine translation model; acquiring third determination information indicating a determination result of a determination as to whether or not the first back-translated clause is correct; acquiring fourth determination information indicating a determination result of a determination as to whether or not the second back-translated clause is correct; and generating the third translated clause when the first back-translated clause and the second back-translated clause are both determined to be correct based on the third determination information and the fourth determination information.

According to this configuration, the first translated clause is applied to the machine translation model to acquire the first back-translated clause obtained by translating the first translated clause into the first language. The second translated clause is applied to the machine translation model to acquire the second back-translated clause obtained by translating the second translated clause into the first language. The third determination information indicating the determination result of the determination as to whether or not the first back-translated clause is correct is acquired. The fourth determination information indicating the determination result of the determination as to whether or not the second back-translated clause is correct is acquired. When the first back-translated clause and the second back-translated clause are both determined to be correct based on the third determination information and the fourth determination information, the third translated clause is generated.

Thus, even when the user does not understand the second language, he or she can easily determine whether or not the first translated clause and the second translated clause are correctly translated, by comparing the first clause in the first language with the first back-translated clause in the first language and comparing the second clause in the first language with the second back-translated clause in the first language.

The translated-clause generating method may further include displaying the first back-translated clause, a third object for causing the user to input a determination result of a determination as to whether or not the first back-translated clause is correct, the second back-translated clause, and a fourth object for causing the user to input a determination result of a determination as to whether or not the second back-translated clause is correct.

According to this configuration, the first back-translated clause, the third object for causing the user to input a determination result of a determination as to whether or not a first back-translated clause is correct, a second back-translated clause, and the fourth object for causing the user to input a determination result of a determination as to whether or not a second back-translated clause is correct are displayed.

Thus, since the user inputs the determination result of the determination as to whether or not the first back-translated clause is correct and inputs the determination result of the determination as to whether or not the second back-translated clause is correct, it is possible to improve the translation accuracy of the third translated clause.

The translated-clause generating method may further include: acquiring the first translated clause by applying the first clause to a machine translation model that has performed learning using a bilingual corpus in which clauses in the first language and translated clauses obtained by translating the clauses in the first language into the second language are associated with each other; and acquiring the second translated clause by applying the second clause to the machine translation model.

According to this configuration, a first translated clause is acquired by applying a first clause to the machine translation model that has performed learning using the bilingual corpus in which clauses in the first language and translated clauses obtained by translating the clauses into the second language are associated with each other. Also, a second translated clause is acquired by applying a second clause to the machine translation model.

A third translated clause can be generated using a first translated clause and a second translated clause obtained by applying a first clause and a second clause to the machine translation model that has performed learning using the bilingual corpus.

The translated-clause generating method may further include: updating the third clause and the third translated clause in the bilingual corpus in association with each other; and causing the machine translation model to perform learning using the updated bilingual corpus.

According to this configuration, the third clause and the third translated clause are associated with each other to update the bilingual corpus. The machine translation model performs learning by using the updated bilingual corpus.

Thus, when translation processing is performed using the machine translation model that has performed learning using the updated bilingual corpus, it is possible to more accurately translate a long clause in which a plurality of clauses are joined together with a conjunction.

The translated-clause generating method may further include: acquiring first determination information indicating a determination result of a determination as to whether or not the first translated clause is correct; acquiring second determination information indicating a determination result of a determination as to whether or not the second translated clause is correct; and generating the third translated clause when the first translated clause and the second translated clause are both determined to be correct based on the first determination information and the second determination information.

According to this configuration, the first determination information indicating the determination result of the determination as to whether or not the first translated clause is correct is acquired. The second determination information indicating the determination result of the determination as to whether or not the second translated clause is correct is acquired. When the first translated clause and the second translated clause are both determined to be correct based on the first determination information and the second determination information, the third translated clause is generated.

Thus, when the first translated clause and the second translated clause are both determined to be correct, the third translated clause is generated, thus making it possible to further improve the translation accuracy of the third translated clause.

The translated-clause generating method may further include: displaying the first translated clause, a first object for causing a user to input the determination result of the determination as to whether or not the first translated clause is correct, the second translated clause, and a second object for causing the user to input the determination result of the determination as to whether or not the second translated clause is correct.

According to this configuration, the first translated clause, the first object for causing a user to input a determination result of a determination as to whether or not the first translated clause is correct, the second translated clause, and the second object for causing the user to input a determination result of a determination as to whether or not the second translated clause is correct are displayed.

Thus, since the user inputs the determination result of the determination as to whether or not the first translated clause is correct and inputs the determination result of the determination as to whether or not the second translated clause is corrected, it is possible to improve the translation accuracy of the third translated clause.

The translated-clause generating method may further include: acquiring a first back-translated clause obtained by translating the first translated clause into the first language through application to the machine translation model; acquiring a second back-translated clause obtained by translating the second translated clause into the first language through application to the machine translation model; acquiring third determination information indicating a determination result of a determination as to whether or not the first back-translated clause is correct; acquiring fourth determination information indicating a determination result of a determination as to whether or not the second back-translated clause is correct; and generating the third translated clause when the first back-translated clause and the second back-translated clause are both determined to be correct based on the third determination information and the fourth determination information.

According to this configuration, the first translated clause is applied to the machine translation model to acquire the first back-translated clause obtained by translating the first translated clause into the first language. The second translated clause is applied to the machine translation model to acquire the second back-translated clause obtained by translating the second translated clause into the first language. The third determination information indicating the determination result of the determination as to whether or not the first back-translated clause is correct is acquired. The fourth determination information indicating the determination result of the determination as to whether or not the second back-translated clause is correct is acquired. When the first back-translated clause and the second back-translated clause are both determined to be correct based on the third determination information and the fourth determination information, the third translated clause is generated.

Thus, even when the user does not understand the second language, he or she can easily determine whether or not the first translated clause and the second translated clause are correctly translated, by comparing the first clause in the first language with the first back-translated clause in the first language and comparing the second clause in the first language with the second back-translated clause in the first language.

The translated-clause generating method may further include displaying the first back-translated clause, a third object for causing the user to input a determination result of a determination as to whether or not the first back-translated clause is correct, the second back-translated clause, and a fourth object for causing the user to input a determination result of a determination as to whether or not the second back-translated clause is correct.

According to this configuration, a first back-translated clause, a third object for causing the user to input a determination result of a determination as to whether or not a first back-translated clause is correct, a second back-translated clause, and a fourth object for causing the user to input a determination result of a determination as to whether or not a second back-translated clause is correct are displayed.

Thus, since the user inputs the determination result of the determination as to whether or not the first back-translated clause is correct and inputs the determination result of the determination as to whether or not the second back-translated clause is correct, it is possible to improve the translation accuracy of the third translated clause.

A translated-clause generating apparatus according to another aspect of the present disclosure is directed to a translated-clause generating apparatus for generating a translated clause used in translation processing between a first language and a second language. The apparatus includes: an acquirer that acquires a first clause in the first language, a first translated clause obtained by translating the first clause into a second language, a second clause in the first language, a second translated clause obtained by translating the second clause into the second language; and a generator that generates, as a translated clause of a third clause obtained by constructing the first clause and the second clause as one sentence by using a first conjunction in the first language, a third translated clause obtained by constructing the first translated clause and the second translated clause as one sentence by using a second conjunction in the second language.

According to this configuration, a first clause in a first language, a first translated clause obtained by translating the first clause into a second language, a second clause in the first language, a second translated clause obtained by translating the second clause into a second language are acquired. a third translated clause obtained by constructing the first translated clause and the second translated clause as one sentence by using a second conjunction in the second language is generated as a translated clause of a third clause obtained by constructing the first clause and the second clause as one sentence by using a first conjunction in the first language.

Thus, when a long clause in which a plurality of clauses are joined together with a conjunction is translated using the generated third translated clause, it is possible to improve the translation performance of the long clause in which the plurality of clauses are joined together with the conjunction.

A non-transitory recording medium according to another aspect of the present disclosure is directed to a non-transitory recording medium storing therein a translated-clause generating program for generating a translated clause used in translation processing between a first language and a second language. The translated-clause generating program causing a computer to: acquire a first clause in the first language, a first translated clause obtained by translating the first clause into the second language, a second clause in the first language, a second translated clause obtained by translating the second clause into the second language; and generate, as a translated clause of a third clause obtained by constructing the first clause and the second clause as one sentence by using a first conjunction in the first language, a third translated clause obtained by constructing the first translated clause and the second translated clause as one sentence by using a second conjunction in the second language.

According to this configuration, a first clause in a first language, a first translated clause obtained by translating the first clause into a second language, a second clause in the first language, and a second translated clause obtained by translating the second clause into the second language are acquired. A third translated clause obtained by constructing the first translated clause and the second translated clause as one sentence by using a second conjunction in the second language is generated as a translated clause of a third clause obtained by constructing the first clause and the second clause as one sentence by using a first conjunction in the first language.

Thus, when a long clause in which a plurality of clauses are joined together with a conjunction is translated using the generated third translated clause, it is possible to improve the translation performance of the long clause in which the plurality of clauses are joined together with the conjunction.

Embodiments according to the present disclosure will be described below with reference to the accompanying drawings. The embodiments described below are examples of implementations of the present disclosure and are not intended to limit the technical scope of the present disclosure. Also, in the accompanying drawings, elements denoted by the same reference numerals indicate that they are the same or similar elements, and thus descriptions thereof are not given hereafter, as appropriate.

First Embodiment

FIG. 1 is a block diagram illustrating the configuration of a bilingual-corpus generating apparatus in a first embodiment of the present disclosure.

A bilingual-corpus generating apparatus 1 in the first embodiment generates a bilingual corpus containing a collection of a plurality of paired clauses, each being constituted by a first clause in a first language and a second clause in a second language different from the first language. As illustrated in FIG. 1, the bilingual-corpus generating apparatus 1 includes a bilingual-corpus storage 14, a category database 15, a category giver 16, a category-tagged-data storage 17, a connection-rule storage 18, a long-clause generator 19, and a bilingual corpus updater 20.

Some or all of the bilingual-corpus storage 14, the category database 15, the category giver 16, the category-tagged-data storage 17, the connection-rule storage 18, the long-clause generator 19, and the bilingual corpus updater 20 may be included in external equipment (e.g., a server computer) that is a separate unit from the bilingual-corpus generating apparatus 1. In this case, the bilingual-corpus generating apparatus 1 illustrated in FIG. 1 includes an interface unit that communicates data with the external equipment. The interface unit transmits the generated bilingual corpus to the external equipment. The interface unit is, for example, an interface circuit using the Universal Serial Bus (USB) standard or a communication interface circuit that complies with the IEEE 802.11 standard or the like.

The bilingual-corpus generating apparatus 1 is implemented by, for example, an information processing apparatus. The information processing apparatus includes, for example, a computer including a central processing unit (CPU), a read-only memory (ROM), a random-access memory (RAM), and an auxiliary storage device. The information processing apparatus may further include a display for outputting data by displaying the data and an input device for inputting data. The information processing apparatus may be implemented by, for example, a stationary information processing apparatus, such as a desktop computer, or a portable information processing apparatus, such as a notebook computer or a tablet computer.

For example, the CPU executes a program (a bilingual-corpus generation program), which is stored in the auxiliary storage device and causes the computer to function as the bilingual-corpus generating apparatus 1, to thereby realize the individual blocks illustrated in FIG. 1. Thus, a bilingual-corpus generating method has been implemented in the computer. In FIG. 1, the blocks indicated by quadrangular shapes are functionally implemented mainly by the CPU, and the blocks indicated by the cylindrical shapes are functionally implemented mainly by storage devices constituted by the ROM, the RAM, the auxiliary storage device, and so on.

The bilingual-corpus storage 14 stores therein a bilingual corpus in which clauses in a first language are associated with translated clauses obtained by translating the clauses into a second language. The bilingual corpus contains a first clause-and-translated-clause pair obtained by pairing a first clause in the first language and a first translated clause obtained by translating the first clause into the second language and a second clause-and-translated-clause pair obtained by pairing a second clause in the first language and a second translated clause obtained by translating the second clause into the second language. In this manner, the bilingual corpus contains a plurality of clause-and-translated-clause pairs, each being obtained by pairing a clause in the first language and a translated clause obtained by translating the clause into the second language different from the first language. The bilingual-corpus storage 14 is connected to the category giver 16 to transmit, to the category giver 16, the first clause in the first language, the first translated clause obtained by translating the first clause into the second language, the second clause in the first language, and the second translated clause obtained by translating the second clause into the second language.

The category database 15 is connected to the category giver 16 to store therein category data to be used by the category giver 16. The category database 15 stores therein category condition data in which words or phrases that can be included in sentences are associated with categories of the sentences.

The category giver 16 acquires the first clause in the first language, the first translated clause obtained by translating the first clause into the second language, the second clause in the first language, and the second translated clause obtained by translating the second clause into the second language. The category giver 16 acquires, from the bilingual-corpus storage 14, the first clause, the first translated clause corresponding to the first clause, the second clause, and the second translated clause corresponding to the second clause. The category giver 16 is connected to the category-tagged-data storage 17 to give tag information indicating a category to a combination of a clause and a translated clause. The category giver 16 identifies the category of the first clause by searching the category database 15 for a category that corresponds to a word or a phrase included in the first clause. The category giver 16 also identifies the category of the second clause by searching the category database 15 for a category that corresponds to a word or a phrase included in the second clause. A specific category giving method for the category giver 16 is described later.

The category-tagged-data storage 17 is connected to the long-clause generator 19 to store clause-and-translated-clause pairs, each being constituted by a clause in the first language and a translated clause in the second language and being given tag information by the category giver 16. The category-tagged-data storage 17 stores a first clause-and-translated-clause pair that is constituted by the first clause and the first translated clause and that is given tag information by the category giver 16 and a second clause-and-translated-clause pair that is constituted by the second clause and the second translated clause and that is given tag information by the category giver 16.

The long-clause generator 19 is connected to the bilingual corpus updater 20 to acquire the first clause, the first translated clause, the second clause, and the second translated clause from the category-tagged-data storage 17 and generates a third clause in which the first clause and the second clause are connected together with a first conjunction and generates a third translated clause in which the first translated clause and the second translated clause are connected together with a second conjunction, based on the tag information and a connection rule.

The long-clause generator 19 generates, as a translated clause of the third clause obtained by constructing the first clause and the second clause as one sentence by using the first conjunction in the first language, a third translated clause obtained by constructing the first translated clause and the second translated clause as one sentence by using the second conjunction in the second language. The long-clause generator 19 identifies the first conjunction and the second conjunction based on the connection rule. The long-clause generator 19 generates a third clause by using the identified first conjunction, the first clause, and the second clause. The connection rule states a correspondence relationship between attribute information indicating an attribute of a sentence and the first conjunction and states a correspondence relationship between the attribute information and the second conjunction. The attribute information is information indicating a category classified according to the meaning of the sentence.

The connection-rule storage 18 is connected to the long-clause generator 19 to store the connection rule. The connection-rule storage 18 stores therein a combination of a first category, which is one of the categories, and a second category, which is one of the categories, in association with the first conjunction and the second conjunction.

The long-clause generator 19 searches the connection-rule storage 18 for the first conjunction and the second conjunction corresponding to the combination of the first category of the first clause and the second category of the second clause to thereby identify the first conjunction and the second conjunction. A specific clause connection method for the long-clause generator 19 is described later.

The bilingual corpus updater 20 is connected to the bilingual-corpus storage 14 to add the bilingual-corpus generated by the long-clause generator 19 to the bilingual-corpus storage 14 to thereby update the bilingual-corpus storage 14. The bilingual corpus updater 20 updates the bilingual corpus by storing the third clause and the third translated clause in the bilingual-corpus storage 14 in association with each other.

Figure 2:
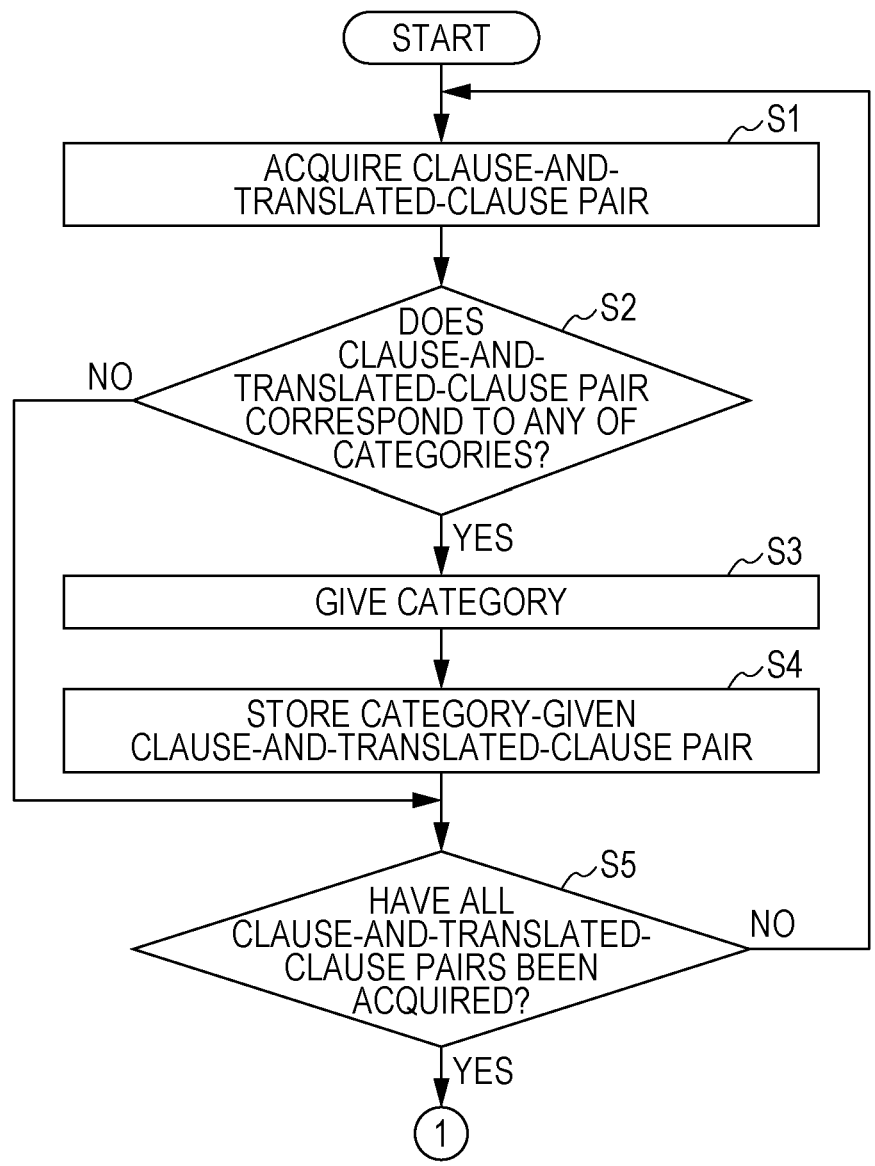
FIG. 2 is a first flowchart illustrating translated-clause generation processing in the bilingual-corpus generating apparatus in the first embodiment of the present disclosure.
Figure 3:
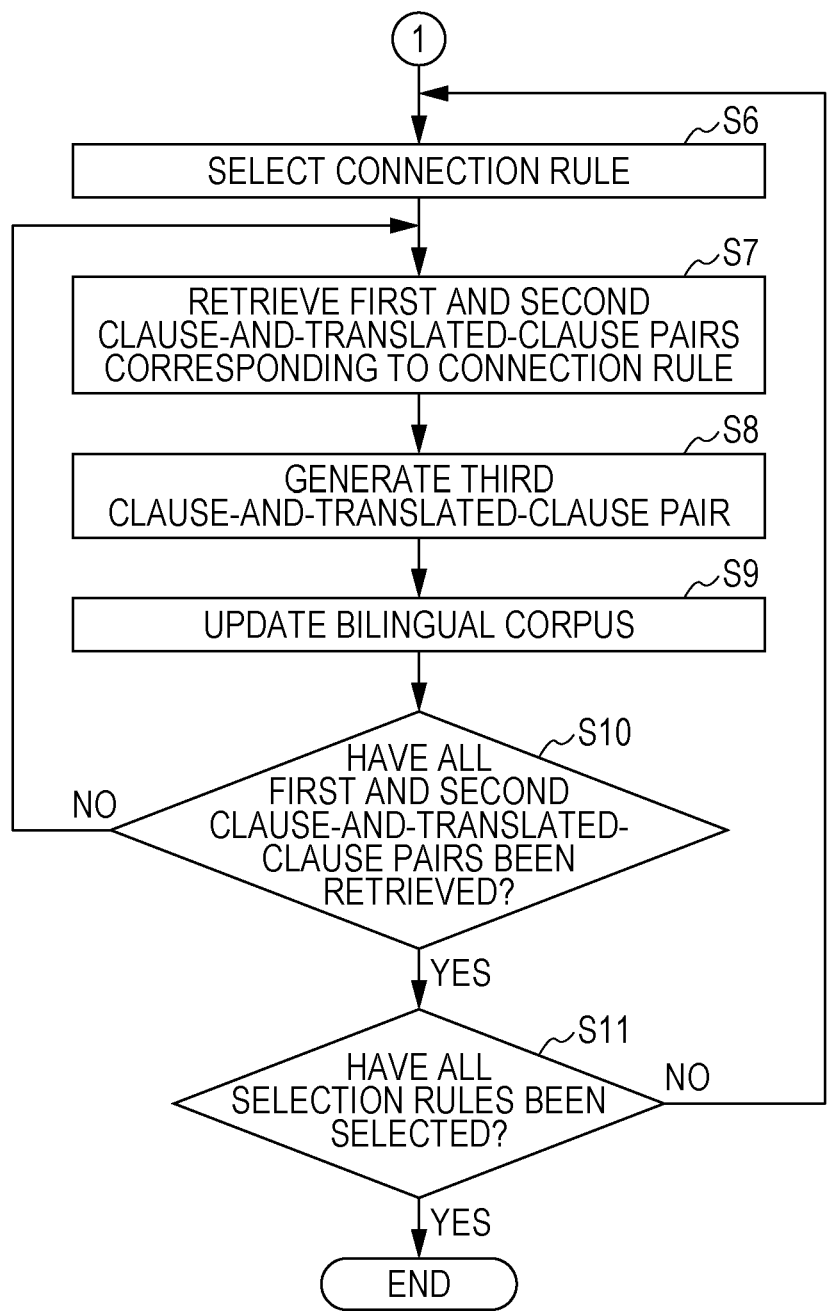
FIG. 3 is a second flowchart illustrating the translated-clause generation processing in the bilingual-corpus generating apparatus in the first embodiment of the present disclosure.

FIG. 2 is a first flowchart illustrating translated-clause generation processing in the bilingual-corpus generating apparatus in the first embodiment of the present disclosure, and FIG. 3 is a second flowchart illustrating the translated-clause generation processing in the bilingual-corpus generating apparatus in the first embodiment of the present disclosure.

First, in step S1, the category giver 16 acquires, from the bilingual-corpus storage 14, a clause-and-translated-clause pair constituted by a clause in a first language and a translated clause obtained by translating the clause in the first language into a second language. In this case, the category giver 16 acquires one of a plurality of clause-and-translated-clause pairs stored in the bilingual-corpus storage 14.

Next, in step S2, the category giver 16 decides whether or not the acquired clause-and-translated-clause pair belongs to any of a plurality of categories. The category giver 16 identifies the category of the clause-and-translated-clause pair by searching the category database 15 for a category that corresponds to a word or a phrase included in the clause.

FIG. 4 illustrates one example of the category condition data stored in the category database and used for deciding whether or not a clause-and-translated-clause pair belongs to a travel category, and FIG. 5 illustrates one example of the category condition data stored in the category database and used for deciding whether or not a clause-and-translated-clause pair belongs to an objective category.

As illustrated in FIG. 4, conditions used for deciding whether or not a clause-and-translated-clause pair belongs to the travel category include first to third conditions described below. The travel category indicates that the content of a clause means travel. For example, the first condition is that words included in a clause in the first language include a verb related to travel, such as "iku", "noru", or "susumu", the second condition is that the words included in the clause in the first language include a noun related to travel, such as "kuruma", "densha", or "toho", and the third condition is that the length of the clause in the first language is smaller than or equal to 15 characters. When a clause in question satisfies the third condition and satisfies one of the first condition and the second condition, that is, when a clause in question satisfies the first condition and the third condition or satisfies the second condition and the third condition, the category giver 16 decides that the corresponding clause-and-translated-clause pair belongs to the travel category. When a clause in question satisfies one of the first condition and the second condition without use of the third condition, the category giver 16 may decide that the corresponding clause-and-translated-clause pair belongs to the travel category.

Also, as illustrated in FIG. 5, conditions used for deciding whether or not a clause-and-translated-clause pair belongs to the objective category include first to third conditions described below. The objective category indicates that the content of a clause means an objective for travel. For example, the first condition is that words included in a clause in the first language include a verb related to an objective, such as "aru", "mieru", or "tsuku", the second condition is that words included in the clause in the first language include a noun related to an objective, such as a landmark name, a place name, or a country name, and the third condition is that the length of the clause in the first language is smaller than or equal to 15 characters. When a clause in question satisfies all of the first condition, the second condition, and the third condition, the category giver 16 decides that the corresponding clause-and-translated-clause pair belongs to the objective category. When a clause in question satisfies the first condition and the second condition without use of the third condition, the category giver 16 may decide that the corresponding clause-and-translated-clause pair belongs to the objective category.

The third condition is a condition for deciding that a clause in question is not a long clause in which a plurality of clauses are joined together with a conjunction and is a clause constituted by one clause. The third condition is not limited to 15 characters. In a non-Japanese language, such as English, the length of the clause in the third condition may be smaller than or equal to 15 words, not 15 characters.

The conditions in FIGS. 4 and 5 are examples. For example, the conditions may state a condition regarding a translated clause in the second language, and a condition for a clause-and-translated-clause pair to belong to the category may be any condition. For example, the long-clause generator 19 may generate a third clause obtained by connecting a first clause belonging to a cause category indicating a cause and a second clause belonging to an effect category indicating an effect to each other using a first conjunction and may generate a third translated clause obtained by connecting a first translated clause belonging to the cause category and a second translated clause belonging to the effect category to each other using a second conjunction.

Referring back to FIG. 2, if it is decided that the clause-and-translated-clause pair does not belong to any of the categories (NO in step S2), the process proceeds to a process in steps S5.

On the other hand, if it is decided that the clause-and-translated-clause pair belongs to any of the categories (YES in step S2), the process proceeds to step S3 in which the category giver 16 gives the corresponding category to the clause-and-translated-clause pair.

Next, in step S4, the category giver 16 stores the category-given clause-and-translated-clause pair in the category-tagged-data storage 17.

Next, in step S5, the category giver 16 decides whether or not all clause-and-translated-clause pairs have been acquired from the bilingual-corpus storage 14. If it is decided that not all clause-and-translated-clause pairs have been acquired (NO in step S5), the process returns to the process in steps S1 in which the category giver 16 acquires another clause-and-translated-clause pair from the bilingual-corpus storage 14. On the other hand, if it is decided that all clause-and-translated-clause pairs have been acquired (YES in step S5), the process proceeds to a process in steps S6.

Processing performed by the category giver 16 will be described below in conjunction with a specific example. In the example below, the first language is Japanese, and the second language is English.

For example, the category giver 16 acquires a clause-and-translated-clause pair including a clause "Massugu iku." and a translated clause "Go straight.", a clause-and-translated-clause pair including a clause "Kyoto tawaa ga aru." and a translated clause "There is a Kyoto tower.", and a clause-and-translated-clause pair including a clause "Kyou wa Tokyo de asobu yotei desu." and a translated clause "Play is scheduled in Tokyo today." (step S1).

Next, the category giver 16 decides whether or not each clause-and-translated-clause pair belongs to any of the categories (step S2). For example, since the clause "Massugu iku." includes a verb "iku" and is less than or equal to 15 characters, the clause satisfies the first condition and the third condition, and thus it is decided that the clause belongs to the travel category. Also, since the clause "Kyoto tawaa ga aru" includes a verb "aru", includes a landmark name "Kyoto tawaa", and is less than or equal to 15 characters, the clause satisfies the first condition, the second condition, and the third condition, and thus it is decided that the clause belongs to the objective category. In addition, since the clause "Kyou wa Tokyo de asobu yotei desu." includes a place name "Tokyo" but does not include a verb that corresponds to the first condition, it is decided that the clause does not belong to any of the travel category and objective category.

FIG. 6 illustrates one example of data stored in the category-tagged-data storage. As illustrated in FIG. 6, each clause-and-translated-clause pair constituted by a clause in the first language and a translated clause in the second language are given tag information indicating a category. For example, the clause-and-translated-clause pair including the clause "Massugu iku." and the translated clause "go straight." is given tag information indicating the travel category, and the clause-and-translated-clause pair including the clause "Kyoto tawaa ga aru." and the translated clause "There is a Kyoto tower." is given tag information indicating the objective category. The data illustrated in FIG. 6 is one example, and the data stored in the category-tagged-data storage 17 is not limited thereto.

Referring back to FIG. 3, when it is decided that all clause-and-translated-clause pairs have been acquired (YES in step S5), the process proceeds to step S6 in which the long-clause generator 19 selects a connection rule to be used.

FIG. 7 illustrates one example of a connection rule stored in the connection-rule storage. This connection rule is that a combination of the categories of clauses to be connected, the first conjunctions in the first language, and the second conjunctions in the second language are associated with each other. In FIG. 7, the first language is Japanese, and the second language is English. The connection rule illustrated in FIG. 7 indicates that a clause in the travel category and a clause in the objective category are connected using the first conjunction "to", "ba", or "tara", and a translated clause in the travel category and a translated clause in the objective category are connected using the second conjunction "and" or "then". A connection rule selection method may be any method. For example, all connection rules pre-stored in the connection-rule storage 18 may be selected, some connection rules may be selected according to a rule, or a connection rule may be randomly selected. In addition, the connection rules may be learned through machine learning or the like. In the first embodiment, the long-clause generator 19 selects one connection rule from a plurality of connection rules stored in the connection-rule storage 18. The connection rules are examples and are not limited to the connection rule described above.

Next, in step S7, the long-clause generator 19 retrieves, from the category-tagged-data storage 17, a first clause-and-translated-clause pair and a second clause-and-translated-clause pair corresponding to the connection rule. For example, when the connection rule is that the travel category and the objective category are connected to each other, the long-clause generator 19 retrieves, from the category-tagged-data storage 17, a first clause-and-translated-clause pair including tag information indicating the travel category and a second clause-and-translated-clause pair including tag information indicating the objective category. The first clause-and-translated-clause pair includes a first clause in a first language, a first translated clause obtained by translating the first clause into a second language, and the second clause-and-translated-clause pair includes a second clause in the first language and a second translated clause obtained by translating the second clause into the second language.

Next, by using the connection rule, the long-clause generator 19 generates a third clause obtained by constructing the first clause and the second clause as one sentence by using a first conjunction and a third translated clause obtained by constructing the first translated clause and the second translated clause as one sentence by using a second conjunction and generates a third clause-and-translated-clause pair including the third clause and the third translated clause (step S8).

Processing performed by the long-clause generator 19 will be described below in conjunction with a specific example.

First, the long-clause generator 19 selects a connection rule to be used (step S6). In this case, it is assumed that the connection rule illustrated in FIG. 7 is selected by way of example.

Next, the long-clause generator 19 retrieves a first clause-and-translated-clause pair and a second clause-and-translated-clause pair corresponding to the connection rule (step S7). Since the connection rule illustrated in FIG. 7 is that the travel category and the objective category are connected to each other, the long-clause generator 19 retrieves a first clause-and-translated-clause pair constituted by a first clause "Massugu iku." given tag information indicating the travel category and a first translated clause "go straight." and a second clause-and-translated-clause pair constituted by a second clause "Kyoto tawaa ga aru." given tag information indicating the objective category and a second translated clause "there is a Kyoto tower."

Next, the long-clause generator 19 generates a third clause-and-translated-clause pair (step S8). In accordance with the connection rule, the long-clause generator 19 connects the first clause and the second clause by using the first conjunction "to" and connects the first translated clause and the second translated clause by using the second conjunction "and", to thereby generate a third clause-and-translated-clause pair constituted by a third clause "Massugu iku to Kyoto tawaa ga aru." and a third translated clause "Go straight and there is a Kyoto tower." Also, in accordance with the connection rule, the long-clause generator 19 connects the first clause and the second clause by using the first conjunction "to" and connects the first translated clause and the second translated clause by using the second conjunction "then", to thereby generate a third clause-and-translated-clause pair constituted by a third clause "Massugu iku to Kyoto tawaa ga aru." and a third translated clause "Go straight then there is a Kyoto tower."

In addition, in accordance with the connection rule, the long-clause generator 19 connects the first clause and the second clause by using the first conjunction "ba" and connects the first translated clause and the second translated clause by using the second conjunction "and", to thereby generate a third clause-and-translated-clause pair constituted by a third clause "Massugu ike ba Kyoto tawaa ga aru." and a third translated clause "Go straight and there is a Kyoto tower." Also, in accordance with the connection rule, the long-clause generator 19 connects the first clause and the second clause by using the first conjunction "ba" and connects the first translated clause and the second translated clause by using the second conjunction "then", to thereby generate a third clause-and-translated-clause pair constituted by a third clause "Massugu ike ba Kyoto tawaa ga aru." and a third translated clause "Go straight then there is a Kyoto tower."

Additionally, in accordance with the connection rule, the long-clause generator 19 connects the first clause and the second clause by using the first conjunction "tara" and connects the first translated clause and the second translated clause by using the second conjunction "and", to thereby generate a third clause-and-translated-clause pair constituted by a third clause "Massugu ittara Kyoto tawaa ga aru." and a third translated clause "Go straight and there is a Kyoto tower." Also, in accordance with the connection rule, the long-clause generator 19 connects the first clause and the second clause by using the first conjunction "tara" and connects the first translated clause and the second translated clause by using the second conjunction "then", to thereby generate a third clause-and-translated-clause pair constituted by a third clause "Massugu ittara Kyoto tawaa ga aru." and a third translated clause "Go straight then there is a Kyoto tower."

As described above, when there is a plurality of clause-and-translated-clause pairs included in the categories, the long-clause generator 19 combines the clause-and-translated-clause pairs. However, all of the clause-and-translated-clause pairs do not necessarily have to be combined, and arbitrarily selected clause-and-translated-clause pairs may be combined.

Referring back to FIG. 3, in step S9, the bilingual corpus updater 20 updates the bilingual corpus by storing, in the bilingual-corpus storage 14, the third clause-and-translated-clause pair in which the third clause and the third translated clause are associated with each other.

Next, in step S10, the long-clause generator 19 decides whether or not all the first clause-and-translated-clause pairs and the second clause-and-translated-clause pairs corresponding to the connection rule have been retrieved from the category-tagged-data storage 17. If the long-clause generator 19 decides that not all of the first clause-and-translated-clause pairs and the second clause-and-translated-clause pairs have been retrieved (NO in step S10), the process returns to the process in step S7 in which the long-clause generator 19 retrieves other first clause-and-translated-clause pair and second clause-and-translated-clause pair.

On the other hand, if the long-clause generator 19 decides that all of the first clause-and-translated-clause pairs and the second clause-and-translated-clause pairs have been retrieved (YES in step S10), the process proceeds to step S11 in which the long-clause generator 19 decides that all selection rules stored in the connection-rule storage 18 have been selected. If the long-clause generator 19 decides that not all of the selection rules have been selected (NO in step S11), the process returns to the process in step S6 in which the long-clause generator 19 selects another selection rule. On the other hand, if the long-clause generator 19 decides that all of the selection rules have been selected (YES in step S11), the processing ends.

FIG. 8 illustrates one example of a pre-update bilingual corpus stored in the bilingual-corpus storage, and FIG. 9 illustrates one example of a post-update bilingual corpus stored in the bilingual-corpus storage. The pre-update bilingual corpus illustrated in FIG. 8 includes five clause-and-translated-clause pairs. In the first embodiment, with respect to the five clause-and-translated-clause pairs, six clause-and-translated-clause pairs are automatically generated and are added to the bilingual corpus. Thus, the post-update bilingual corpus illustrated in FIG. 9 includes 11 clause-and-translated-clause pairs. A clause-and-translated-clause pair to be added may be selected arbitrarily.

When a third clause obtained by constructing a first clause and a second clause as one sentence by using a first conjunction and a third translated clause obtained by constructing a first translated clause and a second translated clause as one sentence by using a second conjunction are associated with each other and are stored in the bilingual-corpus storage 14 in the manner described above, it is possible to decide that a bilingual corpus has been generated by the bilingual-corpus generating apparatus 1.

Second Embodiment

In a second embodiment, a first clause in a first language, a first translated clause obtained by translating the first clause into a second language, a second clause in the first language, a second translated clause obtained by translating the second clause into the second language are acquired; the acquired first clause, first translated clause, second clause, and second translated clause are presented to a user; the user's determination as to whether or not the first translated clause and the second translated clause are correctly translated is received; and when it is determined that the first translated clause and the second translated clause are both correctly translated, a third translated clause obtained by constructing the first translated clause and the second translated clause as one sentence by using a second conjunction in the second language is generated as a translated clause of a third clause obtained by constructing the first clause and the second clause as one sentence by using a first conjunction in the first language.

Figure 10:
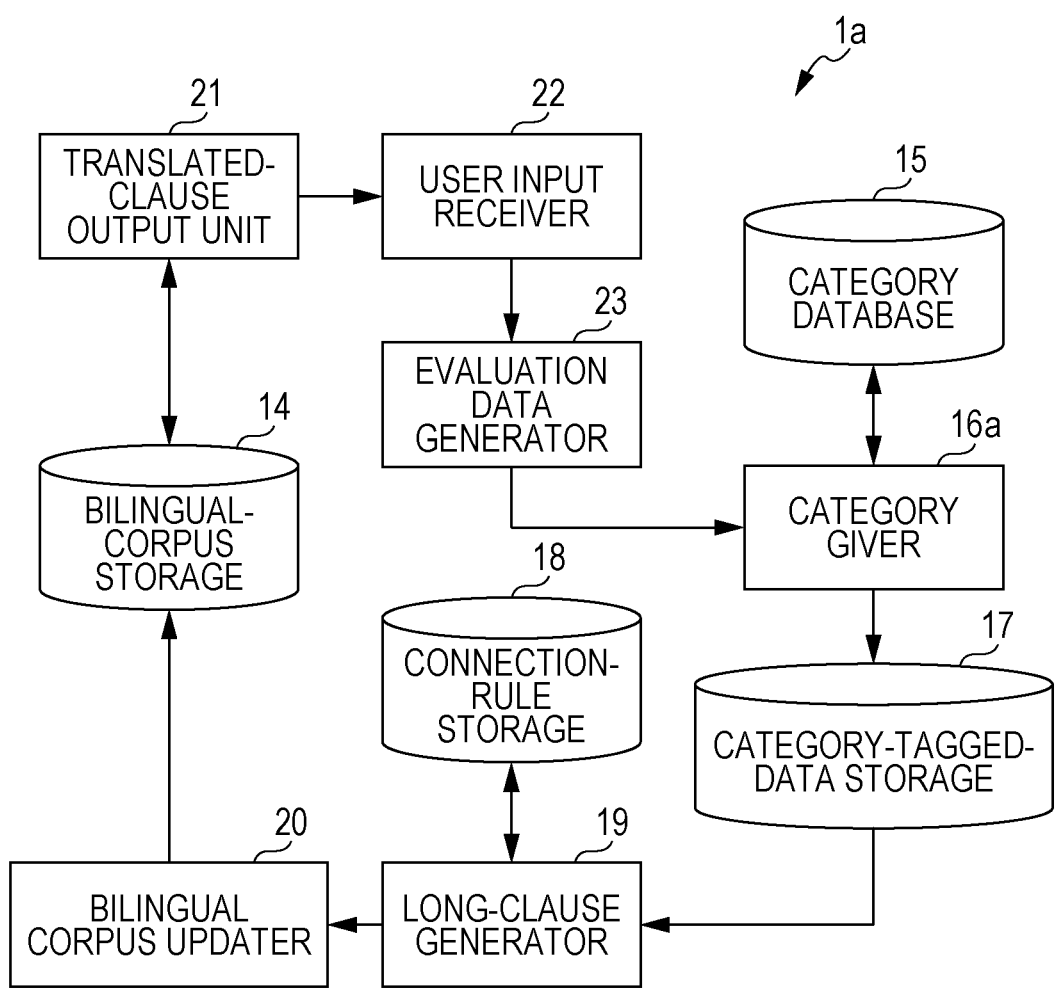
FIG. 10 is a block diagram illustrating the configuration of a bilingual-corpus generating apparatus in a second embodiment of the present disclosure.

FIG. 10 is a block diagram illustrating the configuration of a bilingual-corpus generating apparatus in the second embodiment of the present disclosure.

A bilingual-corpus generating apparatus 1a illustrated in FIG. 10 includes a bilingual-corpus storage 14, a category database 15, a category giver 16a, a category-tagged-data storage 17, a connection-rule storage 18, a long-clause generator 19, a bilingual corpus updater 20, a translated-clause output unit 21, a user input receiver 22, and an evaluation data generator 23.

Some or all of the bilingual-corpus storage 14, the category database 15, the category giver 16a, the category-tagged-data storage 17, the connection-rule storage 18, the long-clause generator 19, and the bilingual corpus updater 20 may be included in external equipment (e.g., a server computer) that is a separate unit from the bilingual-corpus generating apparatus 1a. in this case, the bilingual-corpus generating apparatus 1a illustrated in FIG. 10 includes an interface unit that communicates data with the external equipment. The interface unit transmits the generated bilingual corpus to the external equipment. The interface unit is, for example, an interface circuit using the USB standard or a communication interface circuit that complies with the IEEE 802.11 standard or the like.

For example, a CPU executes a program (a bilingual-corpus generation program), which is stored in an auxiliary storage device and causes a computer to function as the bilingual-corpus generating apparatus 1a, to thereby realize the individual blocks illustrated in FIG. 10. Thus, a bilingual-corpus generating method has been implemented in the computer. In FIG. 10, the blocks indicated by quadrangular shapes are functionally implemented mainly by the CPU, and the blocks indicated by the cylindrical shapes are functionally implemented mainly by storage devices constituted by a ROM, a RAM, the auxiliary storage device, and so on.

The translated-clause output unit 21 is connected to the user input receiver 22 to output a clause and a translated clause acquired from the bilingual-corpus storage 14. A method for outputting the clause and the translated clause may be any method, and in the second embodiment, the translated-clause output unit 21 is a display and displays the clause and the translated clause acquired from the bilingual-corpus storage 14. The clause and the translated clause may be output simultaneously.

The translated-clause output unit 21 acquires, from the bilingual-corpus storage 14, a first clause in a first language, a first translated clause obtained by translating the first clause into a second language, a second clause in the first language, and a second translated clause obtained by translating the second clause into the second language. The translated-clause output unit 21 displays the first translated clause, a first object for causing a user to input a determination result of a determination as to whether or not the first translated clause is correct, the second translated clause, and a second object for causing the user to input a determination result of a determination as to whether or not the second translated clause is correct.

The user input receiver 22 is connected to the evaluation data generator 23 to receive a predetermined operation performed by the user. The user input receiver 22 is, for example, an input device, such as a mouse, a touch panel, or a keyboard with a plurality of input switches or the like to which predetermined functions are assigned. Also, the user input receiver 22 may be an interface unit that communicates data with external equipment and that is the same as or similar to the above-described interface unit.

The user input receiver 22 receives the user's input of the determination result of the determination as to whether or not the first translated clause is correct and also receives the user's input of the determination result of the determination as to whether or not the second translated clause is correct. The user input receiver 22 outputs first determination information indicating the determination result of the determination as to whether or not the first translated clause is correct and also outputs second determination information indicating the determination result of the determination as to whether or not the second translated clause is correct.

The evaluation data generator 23 is connected to the category giver 16a to acquire the first determination information indicating the determination result of the determination as to whether or not the first translated clause is correct and the second determination information indicating the determination result of the determination as to whether or not the second translated clause is correct, the first determination information and second determination information being input via the user input receiver 22. Based on the first determination information and the second determination information, the evaluation data generator 23 outputs, to the category giver 16a, a combination of the first translated clause determined to be correct and the first clause and a combination of the second translated clause determined to be correct and the second clause. Also, based on the first determination information and the second determination information, the evaluation data generator 23 discards a combination of the first translated clause determined not to be correct and the first clause and a combination of the second translated clause determined not to be correct and the second clause.

The category giver 16a acquires, from the evaluation data generator 23, the first clause, the first translated clause corresponding to the first clause, the second clause, and the second translated clause corresponding to the second clause. The first translated clause and the second translated clause acquired by the category giver 16a are translated clauses that were determined by the user to be correctly translated. The category giver 16a gives tag information indicating a category in the same manner as the first embodiment.

When the first translated clause and the second translated clause are both determined to be correct based on the first determination information and the second determination information, the long-clause generator 19 generates a third translated clause.

Figure 11:
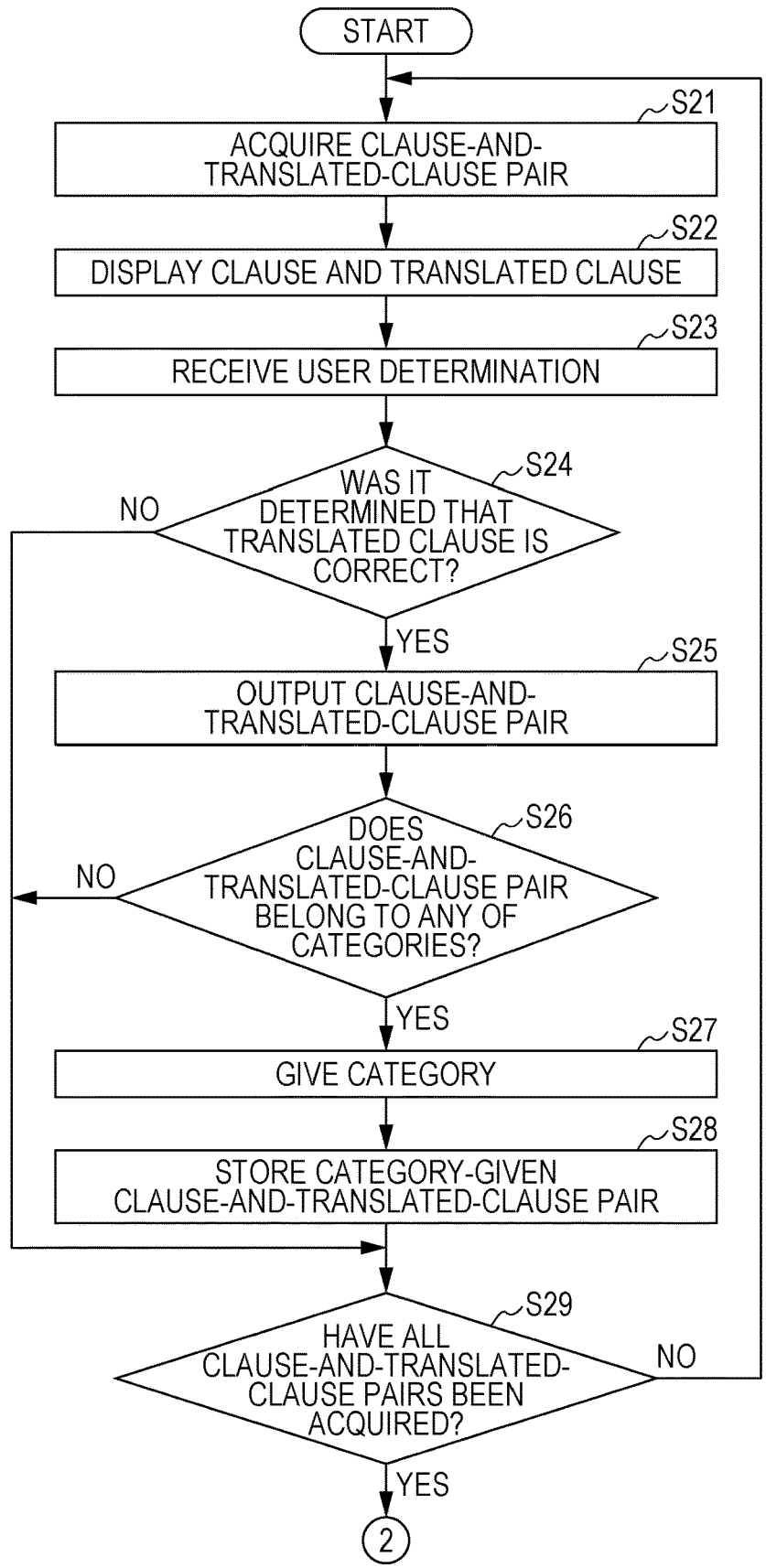
FIG. 11 is a first flowchart illustrating translated-clause generation processing in the bilingual-corpus generating apparatus in the second embodiment of the present disclosure.
Figure 12:
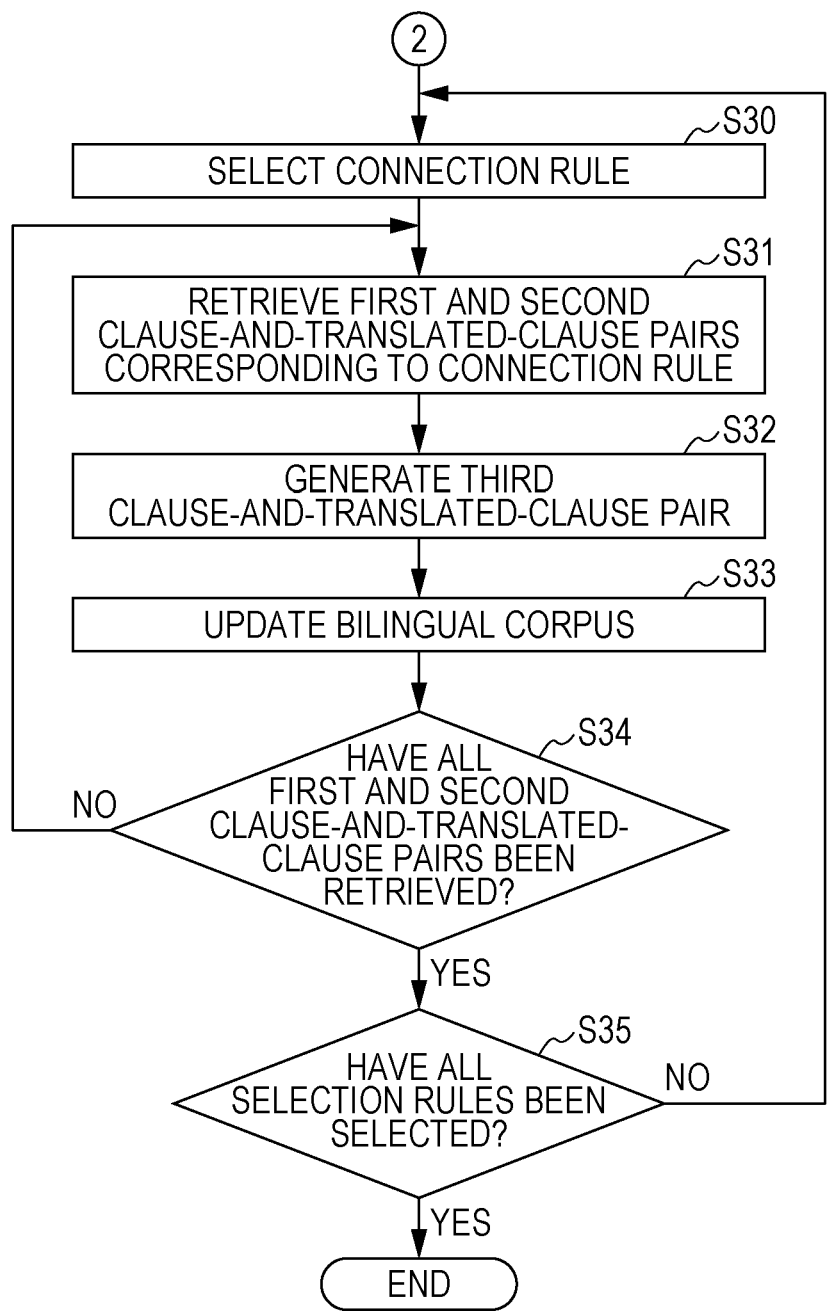
FIG. 12 is a second flowchart illustrating the translated-clause generation processing in the bilingual-corpus generating apparatus in the second embodiment of the present disclosure.

FIG. 11 is a first flowchart illustrating translated-clause generation processing in the bilingual-corpus generating apparatus in the second embodiment of the present disclosure, and FIG. 12 is a second flowchart illustrating the translated-clause generation processing in the bilingual-corpus generating apparatus in the second embodiment of the present disclosure.

First, in step S21, the translated-clause output unit 21 acquires, from the bilingual-corpus storage 14, a clause-and-translated-clause pair constituted by a clause in a first language and a translated clause obtained by translating the clause in the first language into a second language. In this case, the translated-clause output unit 21 acquires one of a plurality of clause-and-translated-clause pairs stored in the bilingual-corpus storage 14.

Next, in step S22, the translated-clause output unit 21 displays the clause in the first language and the translated clause obtained by translating the clause in the first language into the second language, the clauses being acquired from the bilingual-corpus storage 14.

Next, in step S23, the user input receiver 22 receives the user's determination as to whether or not the translated clause displayed by the translated-clause output unit 21 is correct. The user input receiver 22 outputs, to the evaluation data generator 23, determination information indicating a determination result of the determination as to whether or not the translated clause is correct.

Next, in step S24, based on the determination information output from the user input receiver 22, the evaluation data generator 23 decides whether or not the user determined that the translated clause is correct. If the evaluation data generator 23 decides that the user determined that the translated clause is not correct (NO in step S24), the process proceeds to a process in steps S29. The evaluation data generator 23 discards the clause-and-translated-clause pair constituted by the clause in the first language and the translated clause in the second language, the translated clause being determined not to be correct, and does not output the clause-and-translated-clause pair to the category giver 16*a*.

On the other hand, if the evaluation data generator 23 decides that the user determined that the translated clause is correct (YES in step S24), the process proceeds to step S25 in which the evaluation data generator 23 outputs, to the category giver 16*a*, the clause-and-translated-clause pair constituted by the clause in the first language and the translated clause in the second language, the translated clause being determined to be correct.

Since processes in steps S26 to S28 in FIG. 11 are the same as or similar to the processes in steps S2 to S4 in FIG. 2, descriptions thereof are not given hereinafter.

In step S29, the translated-clause output unit 21 decides whether or not all clause-and-translated-clause pairs have been acquired from the bilingual-corpus storage 14. If it is deciding that not all clause-and-translated-clause pairs have been acquired (NO in step S29), the process returns to the process in steps S21 in which the translated-clause output unit 21 acquires another clause-and-translated-clause pair from the bilingual-corpus storage 14. On the other hand, when it is decided that all clause-and-translated-clause pairs have been acquired (YES in step S29), the process proceeds to a process in steps S30.

Since processes in steps S30 to S35 in FIG. 12 are the same as or similar to the processes in steps S6 to S11 illustrated in FIG. 3, descriptions thereof are not given hereinafter.

Figure 13:
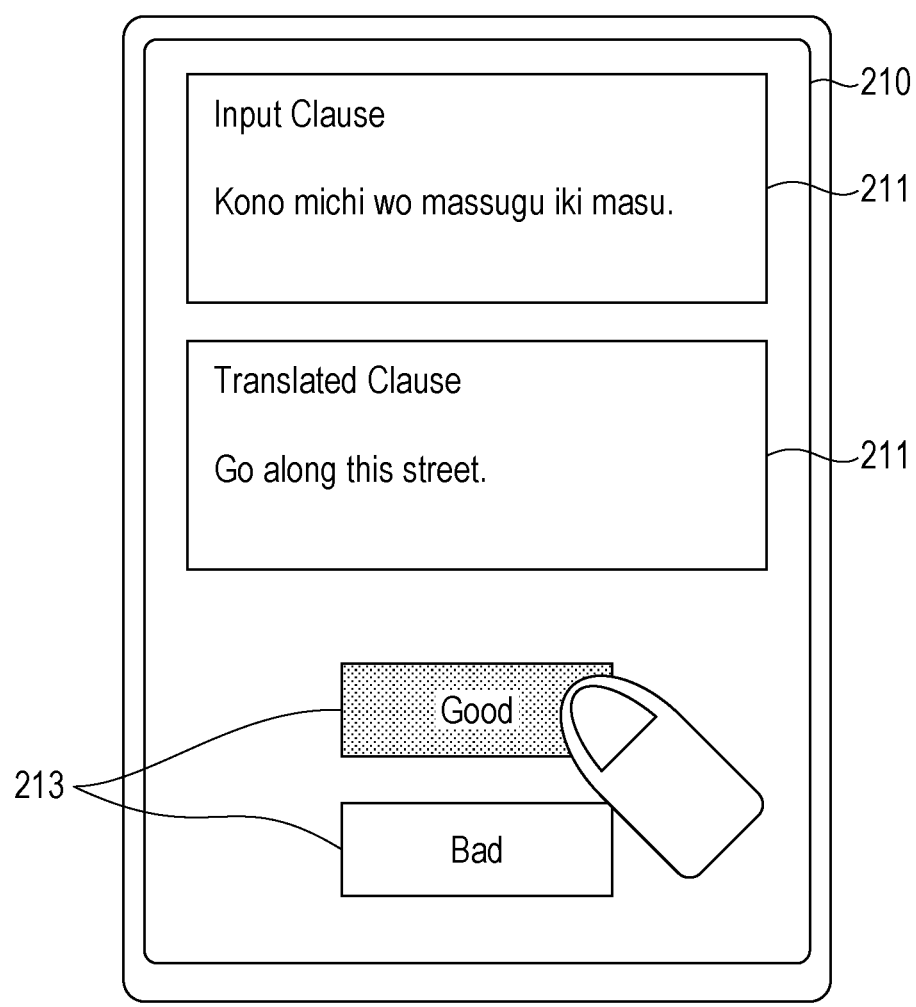
FIG. 13 is a view illustrating one example of a display screen displayed by a translated-clause output unit in the second embodiment.

FIG. 13 is a view illustrating one example of a display screen displayed by the translated-clause output unit in the second embodiment. As illustrated in FIG. 13, the translated-clause output unit 21 displays a display screen 210 including a clause 211 in a first language, a translated clause 212 obtained by translating the clause 211 into a second language, and objects 213 for causing the user to input a determination result of a determination as to whether or not the translated clause 212 is correct. The user determines whether or not a translated clause in a second language which corresponds to a clause in a first language is correctly translated and inputs a determination result.

In the example illustrated in FIG. 13, a clause 211 "Kono michi wo massugu ikimasu." in a first language is displayed, a translated clause 212 "Go along this street." is displayed, and objects 213 for receiving the user's input indicating either "Good" or "Bad" is displayed. When the user determines that the displayed translated clause is correct, he or she selects the object 213 indicating "Good", and when he or she determines that the displayed translated clause is not correct, he or she selects the object 213 indicating "Bad". The user input receiver 22 outputs determination information indicating a determination result of the user to the evaluation data generator 23. The determination information indicating the user's determination result is represented by, for example, a binary indicating whether or not it is determined that the translated clause is correct.

Based on the determination information output from the user input receiver 22, the evaluation data generator 23 decides whether or not the user determined that the translated clause is correct. Upon deciding that the translated clause is not correct, the evaluation data generator 23 discards the clause-and-translated-clause pair constituted by the clause in the first language and the translated clause obtained by translating the clause in the first language into the second language, the translated language being decided not to be correct. On the other hand, upon deciding that the translated clause is correct, the evaluation data generator 23 outputs, to the category giver 16, the clause-and-translated-clause pair constituted by the clause in the first language and the translated clause obtained by translating the clause in the first language into the second language, the translated clause being decided to be correct. In FIG. 13, since "Good" is selected, "Kono michi wo massugu ikimasu." and "Go along this street." are output to the category giver 16*a* as a clause-and-translated-clause pair.

The determination result may be represented by, for example, a numerical value of 0 to 100 (the worst result is represented by 0, and the best result is represented by 100), rather than being represented by a binary, and the user input receiver 22 may represent the correctness of the translated clause upon receiving the user's input of an arbitrary numerical value. In this case, the evaluation data generator 23 may decide whether or not the numerical value input by the user in the process in steps S24 is larger than or equal to a threshold. The above-described pieces of determination information are examples, and the determination information is not limited thereto.

In addition, although, in the second embodiment, the translated-clause output unit 21 acquires, from the bilingual-corpus storage 14, a first clause in a first language, a first translated clause obtained by translating the first clause into a second language, a second clause in the first language, and a second translated clause obtained by translating the second clause into the second language, the present disclosure is not particularly limited thereto. For example, the translated-clause output unit 21 may acquire a first back-translated clause obtained by applying a first translated clause to a machine translation model used for translation processing to thereby translate the first translated clause into the first language and may acquire a second back-translated clause obtained by applying a second translated clause to the machine translation model to thereby translate the second translated clause into the first language. Also, the evaluation data generator 23 may acquire third determination information indicating a determination result of a determination as to whether or not the first back-translated clause is correct and may acquire fourth determination information indicating a determination result of a determination as to whether or not the second back-translated clause is correct. When the first back-translated clause and the second back-translated clause were both determined to be correct based on the third determination information and the fourth determination information, the long-clause generator 19 may generate a third translated clause. The machine translation model is pre-stored in the bilingual-corpus generating apparatus 1*a*, and the machine translation model translates an input clause in a first language into a translated clause in a second language.

The translated-clause output unit 21 may also display a first back-translated clause, a third object for causing the user to input a determination result of a determination as to whether or not the first back-translated clause is correct, a second back-translated clause, and a fourth object for causing the user to input a determination result of a determination as to whether or not the second back-translated clause is correct.

Figure 14:
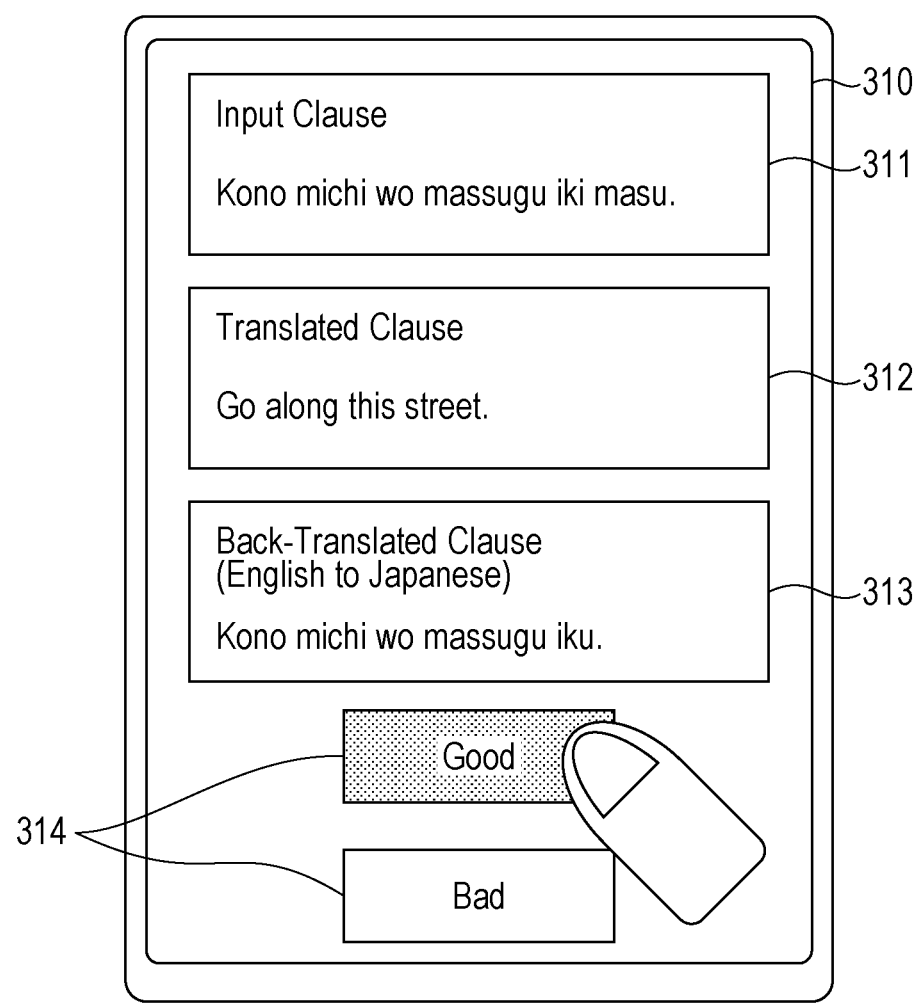
FIG. 14 is a view illustrating one example of a display screen displayed by the translated-clause output unit in a modification of the second embodiment.

FIG. 14 is a view illustrating one example of a display screen displayed by the translated-clause output unit 21 in a modification of the second embodiment. As illustrated in FIG. 14, the translated-clause output unit 21 displays a display screen 310 including a clause 311 in a first language, a translated clause 312 obtained by translating the clause 311 into a second language, a back-translated clause 313 obtained by translating the translated clause 312 into the first language through application to a machine translation model, and an object 314 for causing the user to input a determination result of a determination as to whether or not the translated clause is correct. This user determines whether or not the back-translated clause 313 obtained by back-translating the translated clause 312 in the second language into the first language is correctly translated and inputs a determination result thereof. That is, by comparing the clause 311 in the first language with the back-translated clause 313 in the first language, the user can determine whether or not the translated clause 312 is correctly translated, even when he or she does not know the second language.

In the example illustrated in FIG. 14, a clause 311 "Kono michi wo massugu ikimasu." in a first language is displayed, a translated clause 312 "Go along this street." is displayed, a back-translated clause 313 "Kono michi wo massugu iku." in the first language is displayed, and an object 314 for receiving the user's input indicating either "Good" or "Bad" is displayed. When the user determines that the displayed back-translated clause is correct, he or she selects the object 314 indicating "Good", and when he or she determines that the display back-translated clause is not correct, he or she selects the object 314 indicating "Bad". The user input receiver 22 outputs determination information indicating a determination result of the user to the evaluation data generator 23.

Thereafter, based on the determination information, the evaluation data generator 23 decides whether or not the user determined that the back-translated clause is correct. Upon deciding that the back-translated clause is not correct, the evaluation data generator 23 discards the clause-and-translated-clause pair constituted by the clause in the first language which corresponds to the back-translated clause determined not to be correct and the translated clause obtained by translating the clause in the first language into the second language. On the other hand, upon deciding that the back-translated clause is correct, the evaluation data generator 23 outputs, to the category giver 16, the clause-and-translated-clause pair constituted by the clause in the first language which corresponds to the back-translated clause determined to be correct and the translated clause obtained by translating the clause in the first language into the second language. In FIG. 14, since "Good" is selected, "Kono michi wo massugu ikimasu." and "Go along this street." are output to the category giver 16a as a clause-and-translated-clause pair.

Also, in the second embodiment, the translated-clause output unit 21 may present the user with a third translated clause that is generated by the long-clause generator 19 and that is obtained by constructing a first translated clause and a second translated clause as one sentence by using a second conjunction in the second language. The translated-clause output unit 21 may also present the user with the third translated clause together with a third clause obtained by constructing a first clause and a second clause as one sentence by using a first conjunction in the first language. In this case, when determination information indicating a determination result of a determination as to whether or not the third translated clause is correct is acquired, and it is determined that the third translated clause is correct, the bilingual corpus updater 20 may store the third clause and the third translated clause in the bilingual-corpus storage 14 in association with each other to thereby update the bilingual corpus.

Third Embodiment

In the first and second embodiments described above, a first clause in a first language, a first translated clause obtained by translating the first clause into a second language, a second clause in the first language, and a second translated clause obtained by translating the second clause into the second language are acquired from the bilingual-corpus storage. In contrast, in a third embodiment, a first translated clause and a second translated clause are acquired through application of a first clause and a second clause to a machine translation model that has performed learning using a bilingual corpus.

Figure 15:
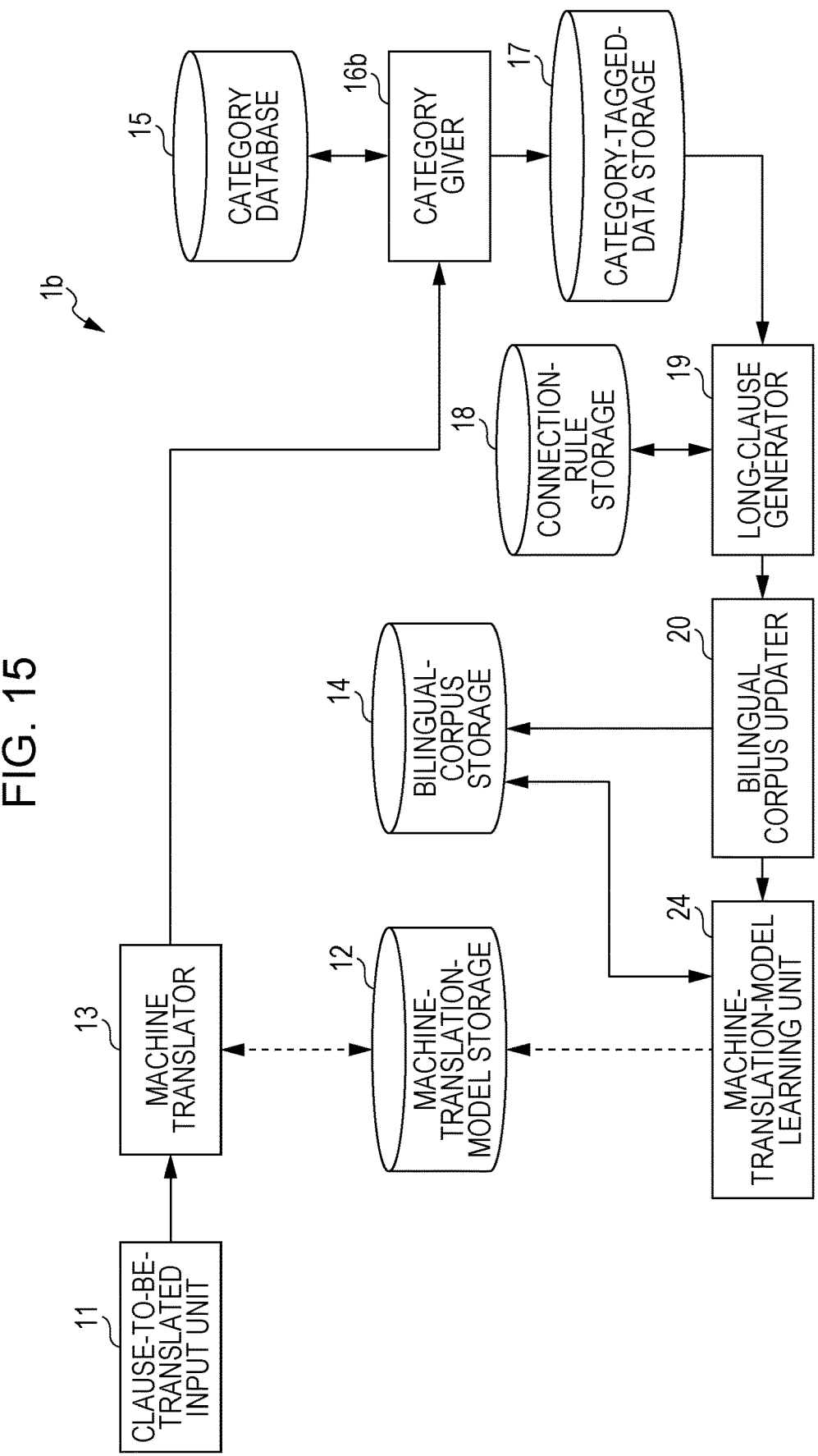
FIG. 15 is a block diagram illustrating the configuration of a bilingual-corpus generating apparatus in a third embodiment of the present disclosure.

FIG. 15 is a block diagram illustrating the configuration of a bilingual-corpus generating apparatus in the third embodiment of the present disclosure.

A bilingual-corpus generating apparatus 1b illustrated in FIG. 15 includes a clause-to-be-translated input unit 11, a machine-translation-model storage 12, a machine translator 13, a bilingual-corpus storage 14, a category database 15, a category giver 16b, a category-tagged-data storage 17, a connection-rule storage 18, a long-clause generator 19, a bilingual corpus updater 20, and a machine-translation-model learning unit 24.

Some or all of the machine-translation-model storage 12, the machine translator 13, the bilingual-corpus storage 14, the category database 15, the category giver 16b, the category-tagged-data storage 17, the connection-rule storage 18, the long-clause generator 19, the bilingual corpus updater 20, and the machine-translation-model learning unit 24 may be included in external equipment (e.g., a server computer) that is a separate unit from the bilingual-corpus generating apparatus 1b. In this case, the bilingual-corpus generating apparatus 1b illustrated in FIG. 15 includes an interface unit that communicates data with external equipment. The interface unit transmits a generated bilingual corpus to the external equipment. The interface unit is, for example, an interface circuit using the USB standard or a communication interface circuit that complies with the IEEE 802.11 standard or the like.

For example, a CPU executes a program (a bilingual-corpus generation program), which is stored in an auxiliary storage device and causes a computer to function as the bilingual-corpus generating apparatus 1b, to thereby realize the individual blocks illustrated in FIG. 15. Thus, a bilingual-corpus generating method has been implemented in the computer. In FIG. 15, the blocks indicated by quadrangular shapes are functionally implemented mainly by the CPU, and the blocks indicated by the cylindrical shapes are functionally implemented mainly by storage devices constituted by a ROM, a RAM, the auxiliary storage device, and so on.

The clause-to-be-translated input unit 11 is connected to the machine translator 13 to receive, for example, predetermined operations. The clause-to-be-translated input unit 11 receives a user's input of a first clause and a second clause in a first language which are to be translated. The clause-to-be-translated input unit 11 is, for example, an input device, such as a mouse, a touch panel, or a keyboard with a plurality of input switches or the like to which predetermined functions are assigned. The clause-to-be-translated input unit 11 may also be, for example, an interface unit that communicates data with external equipment. The predetermined operations include various operations necessary for the bilingual-corpus generating apparatus 1b to generate a bilingual corpus. Examples of the operations include an input operation for inputting clauses in the first language and an input operation for instructing the bilingual-corpus generating apparatus 1b to start generating a bilingual corpus.

The machine-translation-model storage 12 is connected to the machine translator 13 to store a machine translation model used for translation processing between the first language and the second language.

The machine translator 13 is connected to the category giver 16b, generates a first translated clause obtained by translating the first clause in the first language into the second language, and also generates a second translated clause obtained by translating the second clause in the first language into the second language. The machine translator 13 generates a first translated clause by applying the first clause to the machine translation model stored in the machine-translation-model storage 12 and generates a second translated clause by applying the second clause to the machine translation model. The machine translator 13 performs machine translation using statistical machine translation, translation based on a neural network, rule-based translation, or the like, and a machine translation method employed by the machine translator 13 is not particularly limiting. The machine translator 13 outputs, to the category giver 16b, the first clause input via the clause-to-be-translated input unit 11, the first translated clause, the second clause input via the clause-to-be-translated input unit 11, and the second translated clause.

The category giver 16b acquires, from the machine translator 13, the first clause, the first translated clause corresponding to the first clause, the second clause, and the second translated clause corresponding to the second clause. The first translated clause and the second translated clause acquired by the category giver 16b are clauses translated by the machine translator 13. The category giver 16b gives tag information indicating a category in the same manner as the first embodiment.

The machine-translation-model learning unit 24 is connected to the machine-translation-model storage 12 to cause the machine translation model stored in the machine-translation-model storage 12 to perform re-learning using the updated bilingual corpus.

Figure 16:
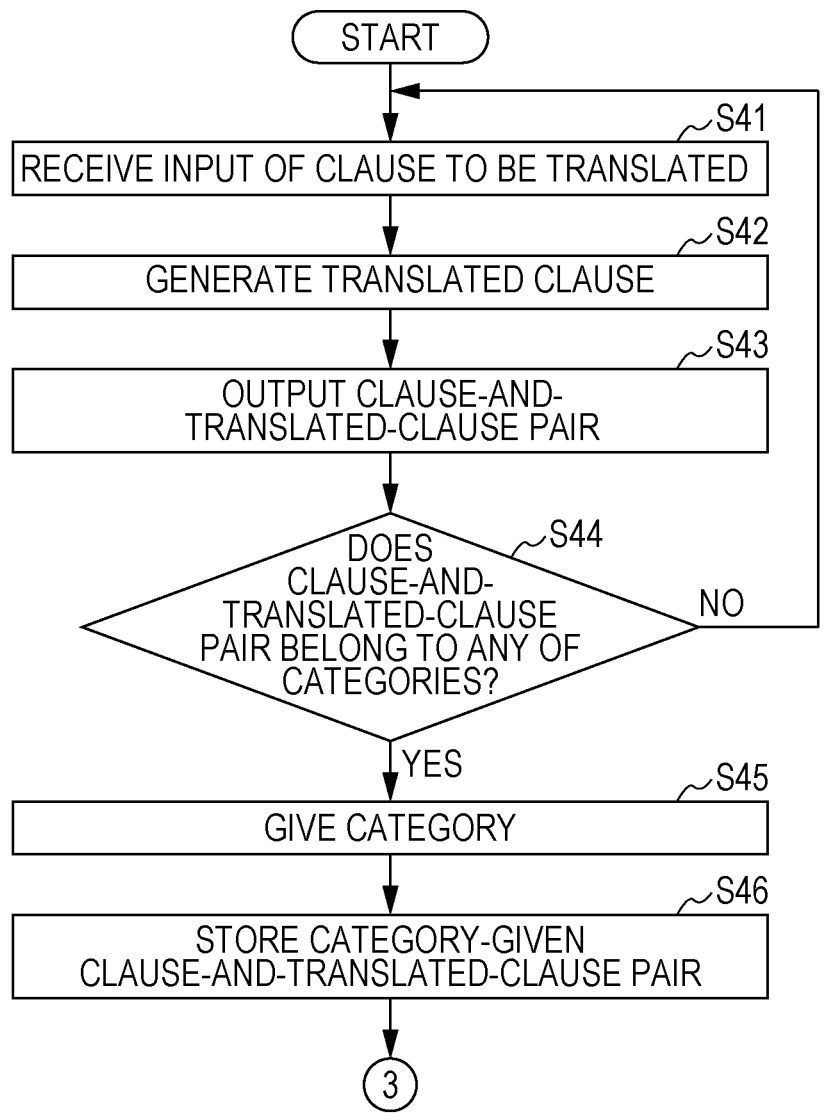
FIG. 16 is a first flowchart illustrating translated-clause generation processing in the bilingual-corpus generating apparatus in the third embodiment of the present disclosure.
Figure 17:
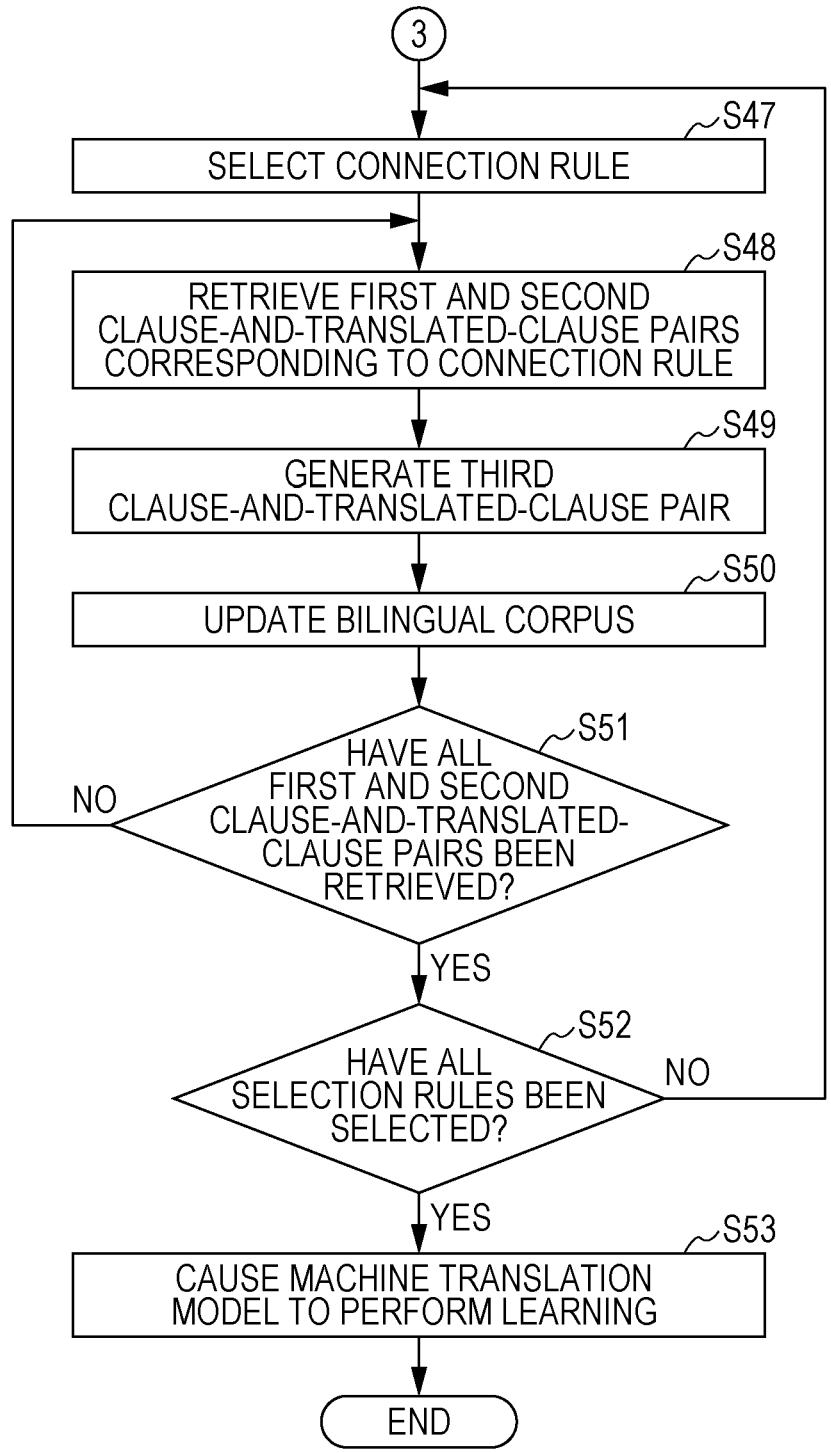
FIG. 17 is a second flowchart illustrating the translated-clause generation processing in the bilingual-corpus generating apparatus in the third embodiment of the present disclosure.

FIG. 16 is a first flowchart illustrating translated-clause generation processing in the bilingual-corpus generating apparatus in the third embodiment of the present disclosure, and FIG. 17 is a second flowchart illustrating the translated-clause generation processing in the bilingual-corpus generating apparatus in the third embodiment of the present disclosure.

First, in step S41, the clause-to-be-translated input unit 11 receives a user's input of an input clause in a first language which is to be translated. In this case, the clause-to-be-translated input unit 11 may receive the input clause in the form of text data or may receive the input clause in the form of audio data. In the case of receiving the clause in the form of audio data, the clause-to-be-translated input unit 11 converts the audio data into text data through voice recognition processing.

Next, in step S42, the machine translator 13 generates a translated clause by applying the input clause to be translated to the machine translation model stored in the machine-translation-model storage 12.

Next, in step S43, the machine translator 13 outputs a clause-and-translated-clause pair constituted by the clause in the first language, the clause being input via the clause-to-be-translated input unit 11, and the generated translated clause in the second language to the category giver 16b.

Next, in step S44, the category giver 16b decides whether or not the acquired clause-and-translated-clause pair belongs to any of a plurality of categories. The category giver 16b identifies the category of the clause-and-translated-clause pair by searching the category database 15 for a category that corresponds to a word or a phrase included in the clause. If it is decided that the clause-and-translated-clause pair does not belong to any of the categories (NO in step S44), the process returns to the process in step S41.

On the other hand, if it is decided that the clause-and-translated-clause pair does belongs to one of the categories (YES in step S44), the process proceeds to step S45 in which the category giver 16b gives the corresponding category to the clause-and-translated-clause pair.

Next, in step S46, the category giver 16b stores the category-given clause-and-translated-clause pair in the category-tagged-data storage 17.

Since processes in steps S47 to S52 in FIG. 17 are the same as or similar to the processes in steps S6 to S11 in FIG. 3, descriptions thereof are not given hereinafter.

Next, in step S53, the machine-translation-model learning unit 24 causes the machine translation model stored in the machine-translation-model storage 12 to perform learning using the updated bilingual corpus.

FIG. 18 illustrates one example of a translation result of machine translation using a machine translation model that has performed learning using a pre-update bilingual corpus, and FIG. 19 illustrates one example of a translation result of machine translation using a machine translation model that has performed learning using a post-update bilingual corpus.

In FIGS. 18 and 19, the input clause is "Massugu iku to Kyoto tawaa ga aru." As illustrated in FIG. 18, for example, when the input clause is machine-translated using the machine translation model that has performed learning using the pre-update bilingual corpus, the translation result is "Go straight and a Kyoto tower." which is not a translated clause in which the first clause and the second clause are correctly connected to each other. In contrast, as illustrated in FIG. 19, when the input clause is machine-translated by using the machine translation model that has performed learning using the post-update bilingual corpus, the translation result is "Go straight and there is a Kyoto tower.", which is a translated clause in which the first clause and the second clause are correctly connected to each other.

Although, in the third embodiment, the category giver 16b acquires, from only the machine translator 13, a first clause in a first language, a first translated clause obtained by translating the first clause into a second language, a second clause in the first language, and a second translated clause obtained by translating the second clause into the second language, the present disclosure is not particularly limited thereto. Specifically, the category giver 16*b* may acquire, from the machine translator 13, a first clause in a first language and a first translated clause obtained by translating the first clause into a second language and may obtain, from the bilingual-corpus storage 14, a second clause in the first language and a second translated clause obtained by translating the second clause into the second language.

Fourth Embodiment

In a fourth embodiment, a first translated clause and a second translated clause obtained by machine translation are presented to a user; a user's determination as to whether or not the first translated clause and the second translated clause are correctly translated is received; and when it is determined that the first translated clause and the second translated clause are both correctly translated, a third translated clause obtained by constructing the first translated clause and the second translated clause as one sentence by using a second conjunction in the second language is generated as a translated clause of a third clause obtained by constructing the first clause and the second clause as one sentence by using a first conjunction in the first language.

Figure 20:
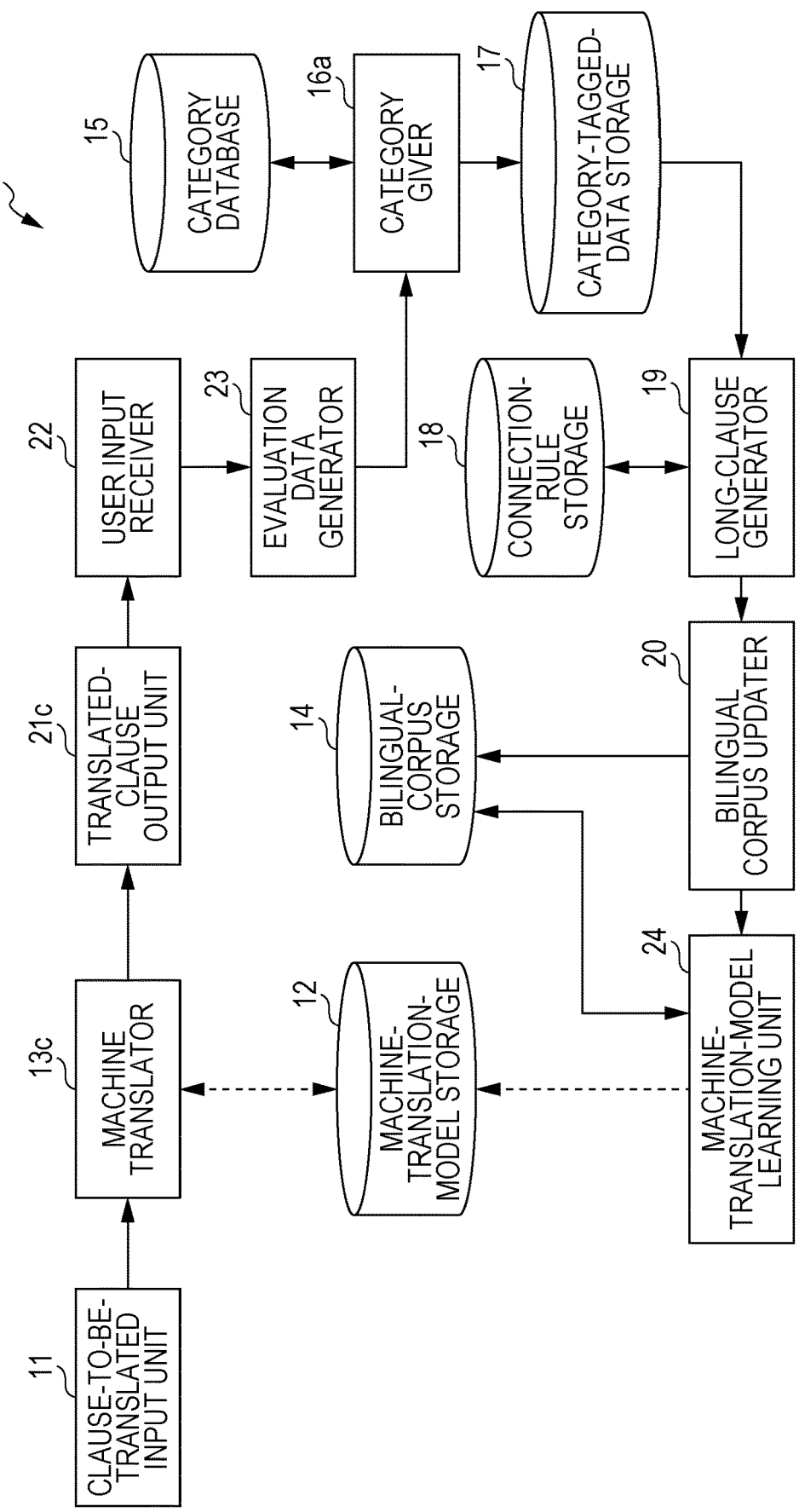
FIG. 20 is a block diagram illustrating the configuration of a bilingual-corpus generating apparatus in a fourth embodiment of the present disclosure.

FIG. 20 is a block diagram illustrating the configuration of a bilingual-corpus generating apparatus in the fourth embodiment of the present disclosure.

A bilingual-corpus generating apparatus 1*c* illustrated in FIG. 20 includes a clause-to-be-translated input unit 11, a machine-translation-model storage 12, a machine translator 13*c*, a bilingual-corpus storage 14, a category database 15, a category giver 16*a*, a category-tagged-data storage 17, a connection-rule storage 18, a long-clause generator 19, a bilingual corpus updater 20, a translated-clause output unit 21*c*, a user input receiver 22, an evaluation data generator 23, and a machine-translation-model learning unit 24.

The machine-translation-model storage 12, the machine translator 13*c*, the bilingual-corpus storage 14, the category database 15, the category giver 16*a*, the category-tagged-data storage 17, the connection-rule storage 18, the long-clause generator 19, the bilingual corpus updater 20, and the machine-translation-model learning unit 24 may be included in external equipment (e.g., a server computer) that is a separate unit from the bilingual-corpus generating apparatus 1*c*. In this case, the bilingual-corpus generating apparatus 1*c* illustrated in FIG. 20 includes an interface unit that communicates data with the external equipment, instead of the bilingual-corpus storage 14 and the bilingual corpus updater 20. The interface unit transmits the generated bilingual corpus to the external equipment. The interface unit is, for example, an interface circuit using the USB standard or a communication interface circuit that complies with the IEEE 802.11 standard or the like.

For example, a CPU executes a program (a bilingual-corpus generation program), which is stored in an auxiliary storage device and causes a computer to function as the bilingual-corpus generating apparatus 1*c*, to thereby realize the individual blocks illustrated in FIG. 20. Thus, a bilingual-corpus generating method has been implemented in the computer. In FIG. 20, the blocks indicated by quadrangular shapes are functionally implemented mainly by the CPU, and the blocks indicated by the cylindrical shapes are functionally implemented mainly by storage devices constituted by a ROM, a RAM, the auxiliary storage device, and so on.

The machine translator 13*c* is connected to the translated-clause output unit 21*c*, generates a first translated clause obtained by translating a first clause in a first language into a second language, and also generates a second translated clause obtained by translating a second clause in the first language into the second language. The machine translator 13*c* generates a first translated clause by applying the first clause to the machine translation model stored in the machine-translation-model storage 12 and generates a second translated clause by applying the second clause to the machine translation model. The machine translator 13*c* performs machine translation using statistical machine translation, translation based on a neural network, rule-based translation, or the like, and a machine translation method employed by the machine translator 13*c* is not particularly limiting. The machine translator 13*c* outputs, to the translated-clause output unit 21*c*, the first clause input via the clause-to-be-translated input unit 11, the first translated clause, the second clause input via the clause-to-be-translated input unit 11, and the second translated clause.

The translated-clause output unit 21*c* is connected to the user input receiver 22 to output the clauses and the translated clauses acquired from the machine translator 13*c*. A method for outputting the clauses and the translated clauses may be any method. In the fourth embodiment, the translated-clause output unit 21*c* is a display and displays the clauses and the translated clauses acquired from the machine translator 13*c*. The clauses and the translated clauses may be output simultaneously.

The translated-clause output unit 21*c* acquires, from the machine translator 13*c*, the first clause in the first language, the first translated clause obtained by translating the first clause into the second language, the second clause in the first language, and the second translated clause obtained by translating the second clause into the second language. The translated-clause output unit 21*c* displays the first translated clause, a first object for causing a user to input a determination result of a determination as to whether or not the first translated clause is correct, the second translated clause, and a second object for causing the user to input a determination result of a determination as to whether or not the second translated clause is correct.

Figure 21:
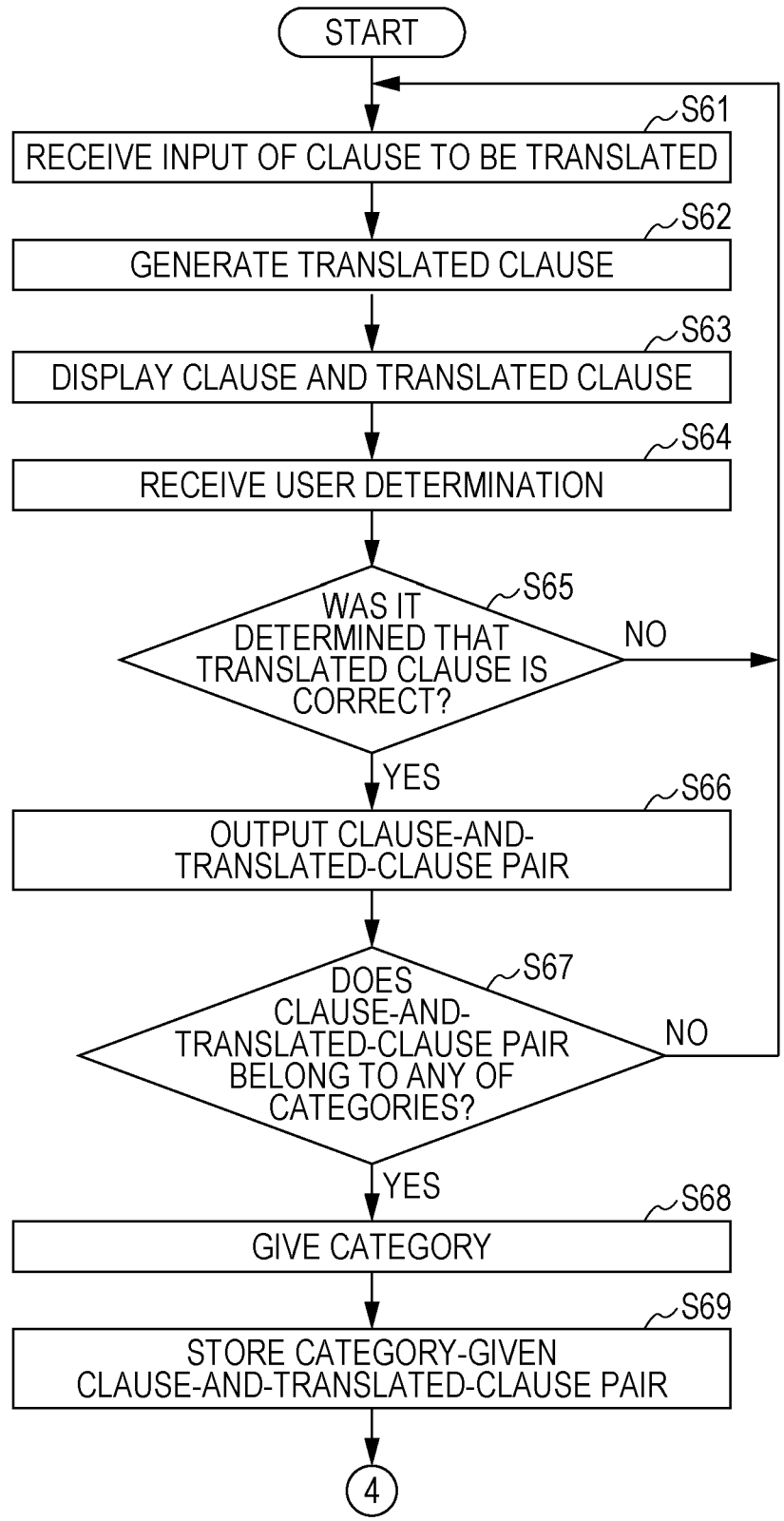
FIG. 21 is a first flowchart illustrating translated-clause generation processing in the bilingual-corpus generating apparatus in the fourth embodiment of the present disclosure.
Figure 22:
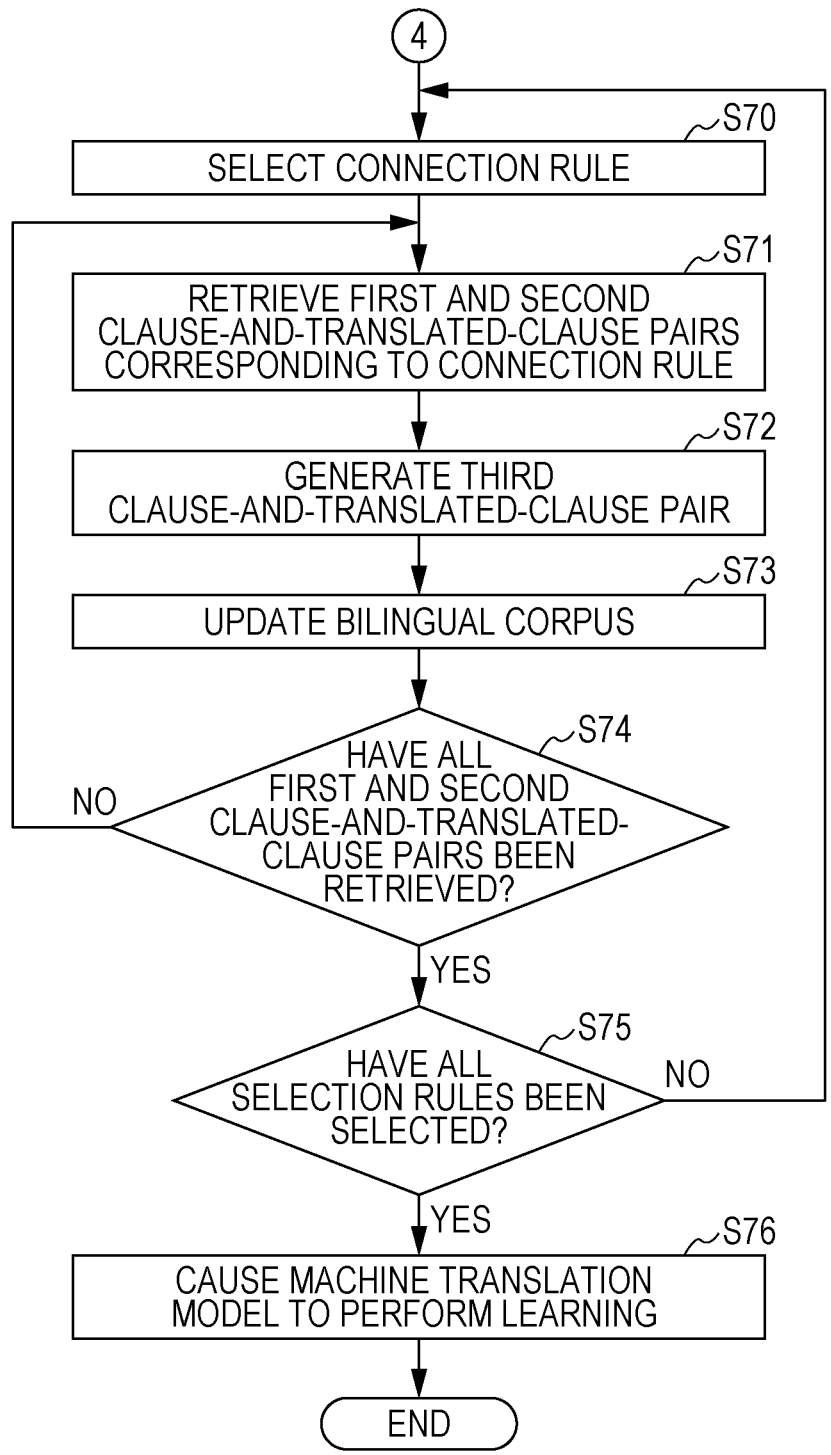
FIG. 22 is a second flowchart illustrating the translated-clause generation processing in the bilingual-corpus generating apparatus in the fourth embodiment of the present disclosure.

FIG. 21 is a first flowchart illustrating translated-clause generation processing in the bilingual-corpus generating apparatus in the fourth embodiment of the present disclosure, and FIG. 22 is a second flowchart illustrating the translated-clause generation processing in the bilingual-corpus generating apparatus in the fourth embodiment of the present disclosure.

First, in step S61, the clause-to-be-translated input unit 11 receives a user's input of an input clause in a first language which is to be translated. In this case, the clause-to-be-translated input unit 11 may receive the input clause in the form of text data or may receive the input clause in the form of audio data. In the case of receiving the clause in the form of audio data, the clause-to-be-translated input unit 11 converts the audio data into text data through voice recognition processing.

Next, in step S62, the machine translator 13*c* generates a translated clause by applying the input clause to be translated to the machine translation model stored in the machine-translation-model storage 12. The machine translator 13*c* outputs, to the translated-clause output unit 21*c*, a clause-and-translated-clause pair constituted by the clause in the first language, the clause being input via the clause-to-be-translated input unit 11, and the generated translated clause in the second language.

The translated-clause output unit 21*c* acquires, from the machine translator 13*c*, the clause-and-translated-clause pair constituted by the clause in the first language and the translated clause in the second language. Next, in step S63, the translated-clause output unit 21c displays the clause in the first language and the translated clause in the second language, the clause and the translated clause being acquired from the machine translator 13c. In this case, the translated-clause output unit 21c displays a display screen that is the same as or similar to the display screen illustrated in FIG. 13.

Next, in step S64, the user input receiver 22 receives the user's determination as to whether or not the translated clause displayed by the translated-clause output unit 21c is correct. The user input receiver 22 outputs, to the evaluation data generator 23, determination information indicating a determination result of the determination as to whether or not the translated clause is correct.

Next, in step S65, based on the determination information output from the user input receiver 22, the evaluation data generator 23 decides whether or not the user determined that the translated clause is correct. If the evaluation data generator 23 decides that the user determined that the translated clause is not correct (NO in step S65), the process returns to the process in steps S61. The evaluation data generator 23 discards the clause-and-translated-clause pair constituted by the clause in the first language and the translated clause in the second language, the translated clause being determined not to be correct, and does not output the clause-and-translated-clause pair to the category giver 16a.

On the other hand, if the evaluation data generator 23 decides that the user determined that the translated clause is correct (YES in step S65), the process proceeds to step S66 in which the evaluation data generator 23 outputs, to the category giver 16a, the clause-and-translated-clause pair constituted by the clause in the first language and the translated clause in the second language, the translated clause being determined to be correct.

Next, in step S67, the category giver 16a decides whether or not the acquired clause-and-translated-clause pair belongs to any of a plurality of categories. The category giver 16a identifies the category of the clause-and-translated-clause pair by searching the category database 15 for a category that corresponds to a word or a phrase included in the clause. If it is decided that the clause-and-translated-clause pair does not belong to any of the categories (NO in step S67), the process returns to the process in step S61.

On the other hand, if it is decided that the clause-and-translated-clause pair belongs to one of the categories (YES in step S67), the process proceeds to step S68 in which the category giver 16a gives the corresponding category to the clause-and-translated-clause pair.

Next, in step S69, the category giver 16a stores the category-given clause-and-translated-clause pair in the category-tagged-data storage 17.

Since processes in steps S70 to S76 in FIG. 22 are the same as or similar to the processes in steps S47 to S53 in FIG. 17, descriptions thereof are not given hereinafter.

Although, in the fourth embodiment, the category giver 16a acquires, from only the evaluation data generator 23, a first clause in a first language, a first translated clause obtained by translating the first clause into a second language, a second clause in the first language, and a second translated clause obtained by translating the second clause into the second language, the present disclosure is not particularly limited thereto. For example, the category giver 16a may acquire, from the evaluation data generator 23, a first clause in a first language and a first translated clause obtained by translating the first clause into a second language and may acquire, from the bilingual-corpus storage 14, a second clause in the first language and a second translated clause obtained by translating the second clause into the second language.

Also, although, in the fourth embodiment, the translated-clause output unit 21c acquires, from the machine translator 13c, a first clause in a first language, a first translated clause obtained by translating the first clause into a second language, a second clause in the first language, and a second translated clause obtained by translating the second clause into the second language, the present disclosure is not particularly limited thereto. For example, the translated-clause output unit 21c may acquire a first back-translated clause obtained by applying a first translated clause to a machine translation model used for translation processing to thereby translate the first translated clause into the first language and may acquire a second back-translated clause obtained by applying a second translated clause to the machine translation model to thereby translate the second translated clause into the first language. Also, the evaluation data generator 23 may acquire third determination information indicating a determination result of a determination as to whether or not the first back-translated clause is correct and may acquire fourth determination information indicating a determination result of a determination as to whether or not the second back-translated clause is correct. When the first back-translated clause and the second back-translated clause were both determined to be correct based on the third determination information and the fourth determination information, the long-clause generator 19 may generate a third translated clause.

The translated-clause output unit 21c may also display a first back-translated clause, a third object for causing the user to input a determination result of a determination as to whether or not the first back-translated clause is correct, a second back-translated clause, and a fourth object for causing the user to input a determination result of a determination as to whether or not the second back-translated clause is correct. In this case, the display screen displayed by the translated-clause output unit 21c is the same as or similar to that display screen illustrated in FIG. 14.

In addition, in the fourth embodiment, the translated-clause output unit 21c may present the user with a third translated clause that is generated by the long-clause generator 19 and that is obtained by constructing a first translated clause and a second translated clause as one sentence by using a second conjunction in the second language. The translated-clause output unit 21c may also present the user with the third translated clause together with a third clause obtained by constructing a first clause and a second clause as one sentence by using a first conjunction in the first language. In this case, when determination information indicating a determination result of a determination as to whether or not the third translated clause is correct is acquired, and it is determined that the third translated clause is correct, the bilingual corpus updater 20 may store the third clause and the third translated clause in the bilingual-corpus storage 14 in association with each other to thereby update the bilingual corpus.

A translated-clause generating method, a translated-clause generating apparatus, and a translated-clause generating program according to the present disclosure can improve the translation performance of a long clause in which a plurality of clauses are joined together with a conjunction, and are useful for a translated-clause generating method, a translated-clause generating apparatus, and a recording medium storing therein a translated-clause generating program which generate translated clauses used in translation processing between a first language and a second language.

What is claimed is:

1. A translated-clause generating method for a translated-clause generating apparatus for generating a translated clause used in translation processing between a first language and a second language, the method comprising:
   acquiring a first clause in the first language, a first translated clause obtained by translating the first clause into a second language, a second clause in the first language, and a second translated clause obtained by translating the second clause into the second language;
   generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language;
   identifying the first conjunction, based on a connection rule stating a correspondence relationship between attribute information indicating an attribute of a sentence and the first conjunction; and
   generating the third clause by using the identified first conjunction, the first clause, and the second clause, wherein
   the connection rule further states a correspondence relationship between the attribute information and the second conjunction;
   the second conjunction is identified based on the connection rule; and
   the third translated clause is generated using the identified second conjunction, the first translated clause, and the second translated clause.

2. The translated-clause generating method according to claim 1, further comprising:
   outputting at least the third translated clause.

3. A translated-clause generating method for a translated-clause generating apparatus for generating a translated clause used in translation processing between a first language and a second language, the method comprising:
   acquiring a first clause in the first language, a first translated clause obtained by translating the first clause into a second language, a second clause in the first language, and a second translated clause obtained by translating the second clause into the second language;
   generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language;
   identifying the first conjunction, based on a connection rule stating a correspondence relationship between attribute information indicating an attribute of a sentence and the first conjunction; and
   generating the third clause by using the identified first conjunction, the first clause, and the second clause,
   wherein the attribute information indicates a category of a plurality of categories classified according to a meaning of the sentence.

4. The translated-clause generating method according to claim 3, wherein
   a category database in which words and phrases that can be included in sentences and categories of the sentences are stored in association with each other is searched for the category that corresponds to a word or a phrase included in the first clause to identify the category of the first clause; and
   the category database is searched for the category that corresponds to a word or a phrase included in the second clause to identify the category of the second clause.

5. The translated-clause generating method according to claim 3, wherein
   the connection rule is stored in a connection rule database;
   a combination of a first category that is one of the plurality of categories and a second category that is one of the plurality of categories, the first conjunction, and the second conjunction are stored in the connection rule database in association with each other; and
   the connection rule database is searched for the first conjunction and the second conjunction corresponding to the combination of the first category of the first clause and the second category of the second clause to identify the first conjunction and the second conjunction.

6. A translated-clause generating method for a translated-clause generating apparatus for generating a translated clause used in translation processing between a first language and a second language, the method comprising:
   acquiring a first clause in the first language, a first translated clause obtained by translating the first clause into a second language, a second clause in the first language, and a second translated clause obtained by translating the second clause into the second language;
   generating, as a translated clause of a third clause obtained by constructing the first clause and the second clause as one sentence by using a first conjunction in the first language, a third translated clause obtained by constructing the first translated clause and the second translated clause as one sentence by using a second conjunction in the second language,
      wherein the first clause, the first translated clause corresponding to the first clause, the second clause, and the second translated clause corresponding to the second clause are acquired from a bilingual-corpus storage that stores therein a bilingual corpus in which clauses in the first language and translated clauses obtained by translating the clauses in the first language into the second language are associated with each other;
   updating the bilingual corpus by storing the third clause and the third translated clause in the bilingual-corpus storage in association with each other; and
   causing a machine translation model used for the translation processing to perform learning using the updated bilingual corpus.

7. The translated-clause generating method according to claim 6, further comprising:
   acquiring first determination information indicating a determination result of a determination as to whether or not the first translated clause is correct;
   acquiring second determination information indicating a determination result of a determination as to whether or not the second translated clause is correct; and
   generating the third translated clause when the first translated clause and the second translated clause are both determined to be correct based on the first determination information and the second determination information.

8. The translated-clause generating method according to claim 7, further comprising:

displaying the first translated clause, a first object for inputting via a user operation the determination result of the determination as to whether or not the first translated clause is correct, the second translated clause, and a second object for inputting via a user operation the determination result of the determination as to whether or not the second translated clause is correct.

9. The translated-clause generating method according to claim 6, further comprising:

acquiring a first back-translated clause obtained by translating the first translated clause into the first language through application of the machine translation model;

acquiring a second back-translated clause obtained by translating the second translated clause into the first language through application of the machine translation model;

acquiring third determination information indicating a determination result of a determination as to whether or not the first back-translated clause is correct;

acquiring fourth determination information indicating a determination result of a determination as to whether or not the second back-translated clause is correct; and generating the third translated clause when the first back-translated clause and the second back-translated clause are both determined to be correct based on the third determination information and the fourth determination information.

10. The translated-clause generating method according to claim 9, further comprising:

displaying the first back-translated clause, a third object for inputting via a user operation a determination result of a determination as to whether or not the first back-translated clause is correct, the second back-translated clause, and a fourth object for inputting via a user operation a determination result of a determination as to whether or not the second back-translated clause is correct.

11. The translated-clause generating method according to claim 1, further comprising:

acquiring the first translated clause by applying the first clause to a machine translation model that has performed learning using a bilingual corpus in which clauses in the first language and translated clauses obtained by translating the clauses in the first language into the second language are associated with each other; and acquiring the second translated clause by applying the second clause to the machine translation model.

12. The translated-clause generating method according to claim 11, further comprising:

updating the third clause and the third translated clause in the bilingual corpus in association with each other; and causing the machine translation model to perform learning using the updated bilingual corpus.

13. The translated-clause generating method according to claim 11, further comprising:

acquiring first determination information indicating a determination result of a determination as to whether or not the first translated clause is correct;

acquiring second determination information indicating a determination result of a determination as to whether or not the second translated clause is correct; and generating the third translated clause when the first translated clause and the second translated clause are both determined to be correct based on the first determination information and the second determination information.

14. The translated-clause generating method according to claim 13, further comprising:

displaying the first translated clause, a first object for inputting via a user operation the determination result of the determination as to whether or not the first translated clause is correct, the second translated clause, and a second object for inputting via a user operation the determination result of the determination as to whether or not the second translated clause is correct.

15. The translated-clause generating method according to claim 11, further comprising:

acquiring a first back-translated clause obtained by translating the first translated clause into the first language through application of the machine translation model;

acquiring a second back-translated clause obtained by translating the second translated clause into the first language through application of the machine translation model;

acquiring third determination information indicating a determination result of a determination as to whether or not the first back-translated clause is correct;

acquiring fourth determination information indicating a determination result of a determination as to whether or not the second back-translated clause is correct; and generating the third translated clause when the first back-translated clause and the second back-translated clause are both determined to be correct based on the third determination information and the fourth determination information.

16. The translated-clause generating method according to claim 15, further comprising:

displaying the first back-translated clause, a third object for inputting via a user operation a determination result of a determination as to whether or not the first back-translated clause is correct, the second back-translated clause, and a fourth object for inputting via a user operation a determination result of a determination as to whether or not the second back-translated clause is correct.

* * * * *